US012561088B2

(12) United States Patent
Kim et al.

(10) Patent No.: US 12,561,088 B2
(45) Date of Patent: Feb. 24, 2026

(54) STORAGE DEVICE COMMUNICATING WITH EXTERNAL STORAGE DEVICE VIA HOST AND OPERATING METHOD OF THE STORAGE DEVICE

(71) Applicant: SAMSUNG ELECTRONICS CO., LTD., Suwon-si (KR)

(72) Inventors: Dongmin Kim, Suwon-si (KR); Jeongwoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/808,829

(22) Filed: Aug. 19, 2024

(65) Prior Publication Data

US 2025/0103239 A1 Mar. 27, 2025

(30) Foreign Application Priority Data

Sep. 21, 2023 (KR) ........................ 10-2023-0126409
Jan. 9, 2024 (KR) ........................ 10-2024-0003845

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 9,471,448 B2 | 10/2016 | Williams et al. | |
| 11,593,031 B2 | 2/2023 | Shin et al. | |
| 11,644,994 B2 * | 5/2023 | Du ........................ | G06F 3/0646 |
| | | | 711/165 |
| 11,893,269 B2 | 2/2024 | Ryu et al. | |
| 2011/0219170 A1 * | 9/2011 | Frost ..................... | G06F 3/0655 |
| | | | 711/E12.001 |
| 2012/0198127 A1 | 8/2012 | Lan et al. | |
| 2014/0372698 A1 | 12/2014 | Lee et al. | |
| 2018/0024962 A1 * | 1/2018 | Lee ....................... | G06F 3/0632 |
| | | | 710/106 |

(Continued)

FOREIGN PATENT DOCUMENTS

| KR | 10-2022-0047443 A | 4/2022 |
|---|---|---|
| KR | 10-2022-0048303 A | 4/2022 |

(Continued)

OTHER PUBLICATIONS

Communication issued on Jan. 23, 2025 by the European Patent Office in European Patent Application No. 24191980.2.

*Primary Examiner* — Mark A Giardino, Jr.
(74) *Attorney, Agent, or Firm* — Sughrue Mion, PLLC

(57) ABSTRACT

Provided are a storage device performing communication with an external storage device via a host and an operating method of the storage device. The operating method includes: receiving a first packet from the host; transmitting a second packet to the host in response to the first packet, wherein the second packet includes first information to be provided to an external storage device and a device ID value that indicates the external storage device; and receiving a third packet from the host, wherein the third packet includes second information generated by the external storage device.

20 Claims, 28 Drawing Sheets

(56) References Cited

U.S. PATENT DOCUMENTS

| | | | | |
|---|---|---|---|---|
| 2019/0179540 | A1* | 6/2019 | Boenapalli | .............. G06F 3/065 |
| 2021/0374079 | A1 | 12/2021 | Shin et al. | |
| 2022/0113895 | A1 | 4/2022 | Jang et al. | |
| 2022/0197509 | A1* | 6/2022 | Kim | .................... G06F 12/0246 |
| 2022/0318091 | A1 | 10/2022 | Jeon | |
| 2023/0144485 | A1 | 5/2023 | Lee et al. | |
| 2024/0004552 | A1* | 1/2024 | Zhang | ................... G06F 3/0661 |
| 2024/0053895 | A1* | 2/2024 | Gohain | ................. G06F 3/0611 |
| 2024/0319913 | A1* | 9/2024 | Akavaram | .............. G06F 3/061 |

FOREIGN PATENT DOCUMENTS

| | | | |
|---|---|---|---|
| KR | 10-2462708 | B1 | 11/2022 |
| KR | 10-2023-0040057 | A | 3/2023 |
| KR | 10-2532099 | B1 | 5/2023 |
| KR | 10-2555800 | B1 | 7/2023 |

* cited by examiner

GENERATE INTERNAL COMMAND OR PAYLOAD —S11

ADD INTERNAL COMMAND OR PAYLOAD TO EHS DATA REGION OF UPIU —S12

ADD FORMAT INFORMATION TO EHS HEADER REGION OF UPIU —S13

ADD TARGET DEVICE ID AND SOURCE DEVICE ID TO HEADER REGION OF UPIU —S14

TRANSMIT UPIU TO HOST —S15

| RESPONSE UPIU | | | |
|---|---|---|---|
| Transaction Type | Flags | LUN | Task Tag |
| IID \| CST | EXT_IID \| DST_DEVICE_ID | Reserved | Status |
| Total EHS Length | Device Information | Data Segment Length | |
| Residual Transfer Length | | | |
| EHS (EHS Header + EHS Data) | | | |

⬆

| INTERNAL COMMAND UPIU | | | |
|---|---|---|---|
| Transaction Type | Flags | LUN | Task Tag |
| IID \| CST | Reserved | Reserved | EXT_IID \| Reserved |
| Total EHS Length | Reserved | Data Segment Length (0000h) | |
| Expected Data Transfer Length | | | |
| CDB | | | |

FIG. 13

| COMMAND UPIU | | | |
|---|---|---|---|
| Transaction Type | Flags | LUN | Task Tag |
| IID \| CST | SRC_DEVICE_ID | Reserved | EXT_IID \| Reserved |
| Total EHS Length | Reserved | Data Segment Length (0000h) | |
| Expected Data Transfer Length | | | |
| CDB | | | |
| EHS (EHS Header + EHS Data) | | | |

⇧

| INTERNAL RESPONSE UPIU | | | |
|---|---|---|---|
| Transaction Type | Flags | LUN | Task Tag |
| IID \| CST | EXT_IID \| Reserved | Reserved | Status |
| Total EHS Length | Device Information | Data Segment Length | |
| Residual Transfer Length | | | |
| Reserved | | | |
| CDB | | | |

FIG. 14A

| COMMAND UPIU | | | |
|---|---|---|---|
| 0<br><br>xx00 0001b | 1<br><br>Flags | 2<br><br>LUN | 3<br><br>Task Tag |
| 4<br><br>IID \| Command Set Type | 5<br><br>Reserved | 6<br><br>Reserved | 7<br><br>EXT_IID \| DST_DEVICE_ID |
| 8<br><br>Total EHS Length | 9<br><br>Reserved | 10    (MSB)<br>Data Segment Length (0000h) | 11    (LSB) |
| 12    (MSB) | 13<br>Expected Data Transfer Length | 14 | 15    (LSB) |
| 16<br><br>CDB[0] | 17<br><br>CDB[1] | 18<br><br>CDB[2] | 19<br><br>CDB[3] |

FIG. 14B

| RESPONSE UPIU | | | |
|---|---|---|---|
| 0<br><br>xx10 0010b | 1<br><br>Flags | 2<br><br>LUN | 3<br><br>Task Tag |
| 4<br><br>IID \| Reserved | 5<br><br>EXT_IID \| DST_DEVICE_ID | 6<br><br>Response | 7<br><br>Status |
| 8<br><br>Total EHS Length | 9<br><br>Device Information | 10    (MSB)<br>Data Segment Length | 11    (LSB) |
| 12    (MSB) | 13 | 14<br>Residual Transfer Count | 15    (LSB) |
| 16 | 17 | 18<br>Reserved | 19 |
| 20 | 21 | 22<br>Reserved | 23 |

FIG. 15A

| TASK MANAGEMENT REQUEST UPIU | | | |
|---|---|---|---|
| 0<br>xx00 0100b | 1<br>Flags | 2<br>LUN | 3<br>Task Tag |
| 4<br>IID \| Reserved | 5<br>Task Manag. Function | 6<br>Reserved | 7<br>EXT_IID \| DST_DEVICE_ID |
| 8<br>Total EHS Length (00h) | 9<br>Reserved | 10    (MSB) | 11    (LSB) |
| | | Data Segment Length (0000h) | |
| 12    (MSB) | 13 | 14 | 15    (LSB) |
| | Input Parameter 1 | | |
| 16    (MSB) | 17 | 18 | 19    (LSB) |
| | Input Parameter 2 | | |

FIG. 15B

| TASK MANAGEMENT RESPONSE UPIU | | | |
|---|---|---|---|
| 0<br>xx10 0100b | 1<br>Flags | 2<br>LUN | 3<br>Task Tag |
| 4<br>IID    Reserved | 5<br>EXT_IID   DST_DEVICE_ID | 6<br>Response | 7<br>Reserved |
| 8<br>Total EHS Length(00h) | 9<br>Reserved | 10   (MSB)<br>Data Segment Length (0000h) | 11   (LSB) |
| 12   (MSB) | 13<br>Output Parameter 1 | 14 | 15   (LSB) |
| 16 | 17<br>Output Parameter 2 | 18 | 19 |

FIG. 16A

| QUERY REQUEST UPIU | | | |
|---|---|---|---|
| 0<br>xx10 0110b | 1<br>Flags | 2<br>Reserved | 3<br>Task Tag |
| 4<br>Reserved | 5<br>Query Function | 6<br>Reserved | 7<br>Reserved   DST_<br>DEVICE_ID |
| 8<br>Total EHS Length(00h) | 9<br>Reserved | 10     (MSB)<br>Data Segment Length | 11     (LSB) |
| 12 | 13<br>Transaction Specific Fields | 14 | 15 |
| 16 | 17<br>Transaction Specific Fields | 18 | 19 |

FIG. 16B

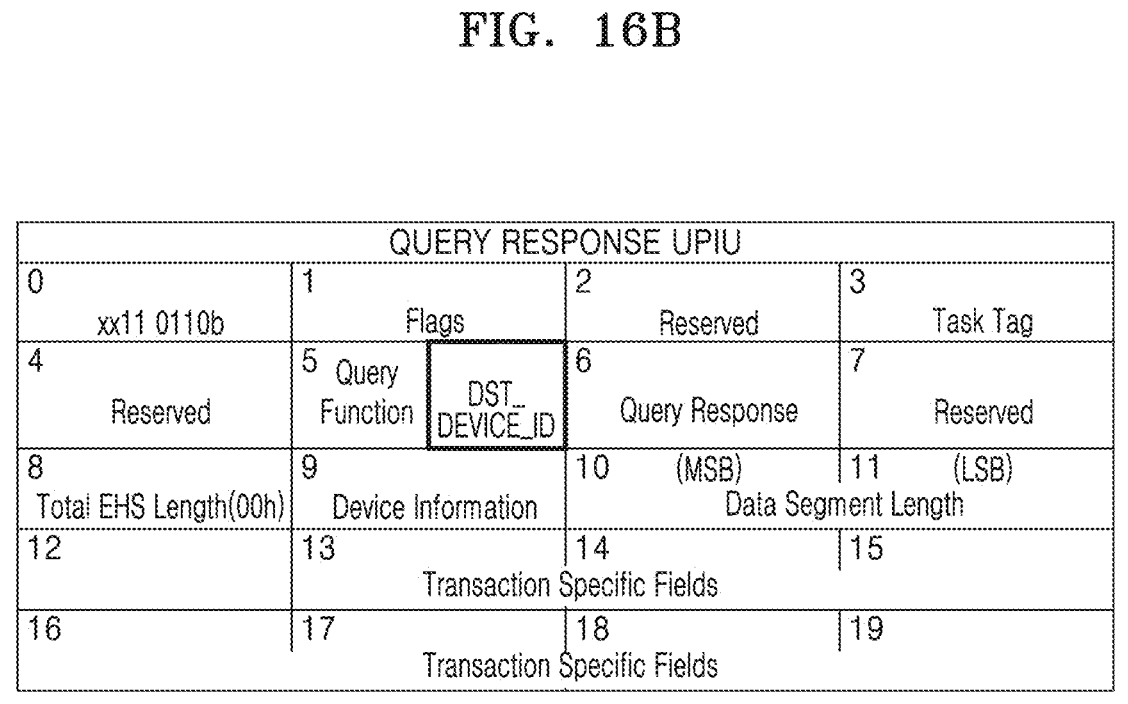

| QUERY RESPONSE UPIU | | | |
|---|---|---|---|
| 0<br>xx11 0110b | 1<br>Flags | 2<br>Reserved | 3<br>Task Tag |
| 4<br>Reserved | 5 Query<br>Function ⎹DST_<br>DEVICE_ID | 6<br>Query Response | 7<br>Reserved |
| 8<br>Total EHS Length(00h) | 9<br>Device Information | 10      (MSB)<br>Data Segment Length | 11      (LSB) |
| 12 | 13<br>Transaction Specific Fields | 14 | 15 |
| 16 | 17<br>Transaction Specific Fields | 18 | 19 |

FIG. 17A

| Byte | Name | Description |
|------|------|-------------|
| 0 | bLength | Size of the EHS Entry in 32 byte units |
| 1 | bEHSType | EHS Type<br>00h : Reserved<br>01h : Advanced RPMB<br>02h~7Fh : Reserved<br>80h~FFh : Vendor specific |
| 2:3 | wEHSSubType | EHS Sub Type |
| 4:(32*bLength)−1 | EHS data | EHS Data<br>Data in this field depends on the EHS Type and EHS Sub Type |

FIG. 18

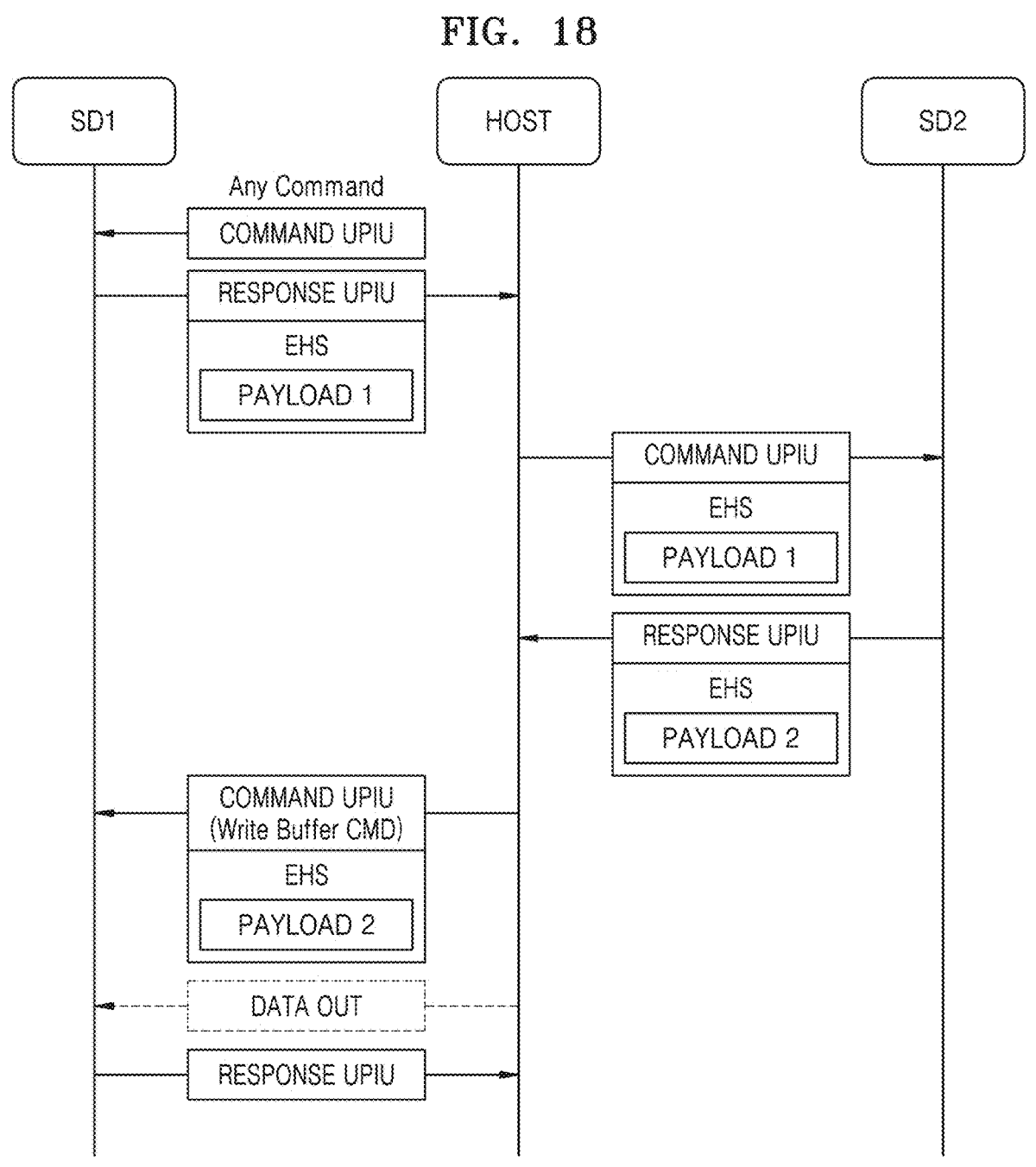

```
SD1                          HOST                          SD2

Any Command
            ┌─────────────────┐
         ◀──│  COMMAND UPIU   │
            ├─────────────────┤
         ──▶│  RESPONSE UPIU  │──▶
            ├─────────────────┤
            │       EHS       │
            │  ┌───────────┐  │
            │  │ PAYLOAD 1 │  │
            │  └───────────┘  │
            └─────────────────┘

┌─────────────────┐
                              │  COMMAND UPIU   │──▶
                              ├─────────────────┤
                              │       EHS       │
                              │  ┌───────────┐  │
                              │  │ PAYLOAD 1 │  │
                              │  └───────────┘  │
                              └─────────────────┘
                              ┌─────────────────┐
                           ◀──│  RESPONSE UPIU  │
                              ├─────────────────┤
                              │       EHS       │
                              │  ┌───────────┐  │
                              │  │ PAYLOAD 2 │  │
                              │  └───────────┘  │
                              └─────────────────┘

┌─────────────────┐
            │  COMMAND UPIU   │
         ◀──│ (Write Buffer CMD)│
            ├─────────────────┤
            │       EHS       │
            │  ┌───────────┐  │
            │  │ PAYLOAD 2 │  │
            │  └───────────┘  │
            ├─────────────────┤
         ◀--│    DATA OUT     │----
            ├─────────────────┤
         ──▶│  RESPONSE UPIU  │──▶
            └─────────────────┘
```

Figure 21:
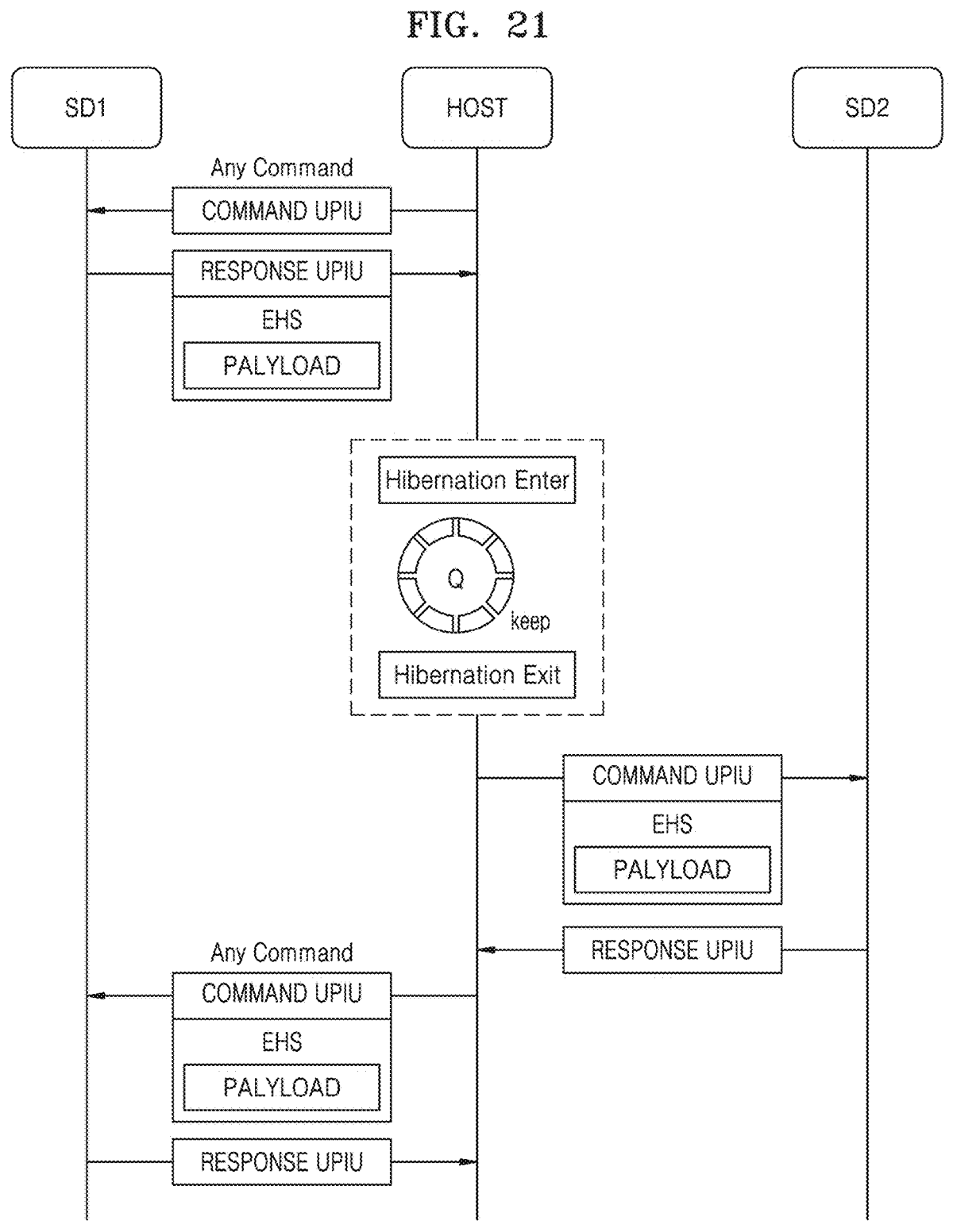

SD1                    HOST                    SD2

Any Command

COMMAND UPIU

RESPONSE UPIU

EHS

PALYLOAD

Hibernation Enter

Q keep

Hibernation Exit

COMMAND UPIU

EHS

PALYLOAD

RESPONSE UPIU

Any Command

COMMAND UPIU

EHS

PALYLOAD

RESPONSE UPIU

Figure 23:
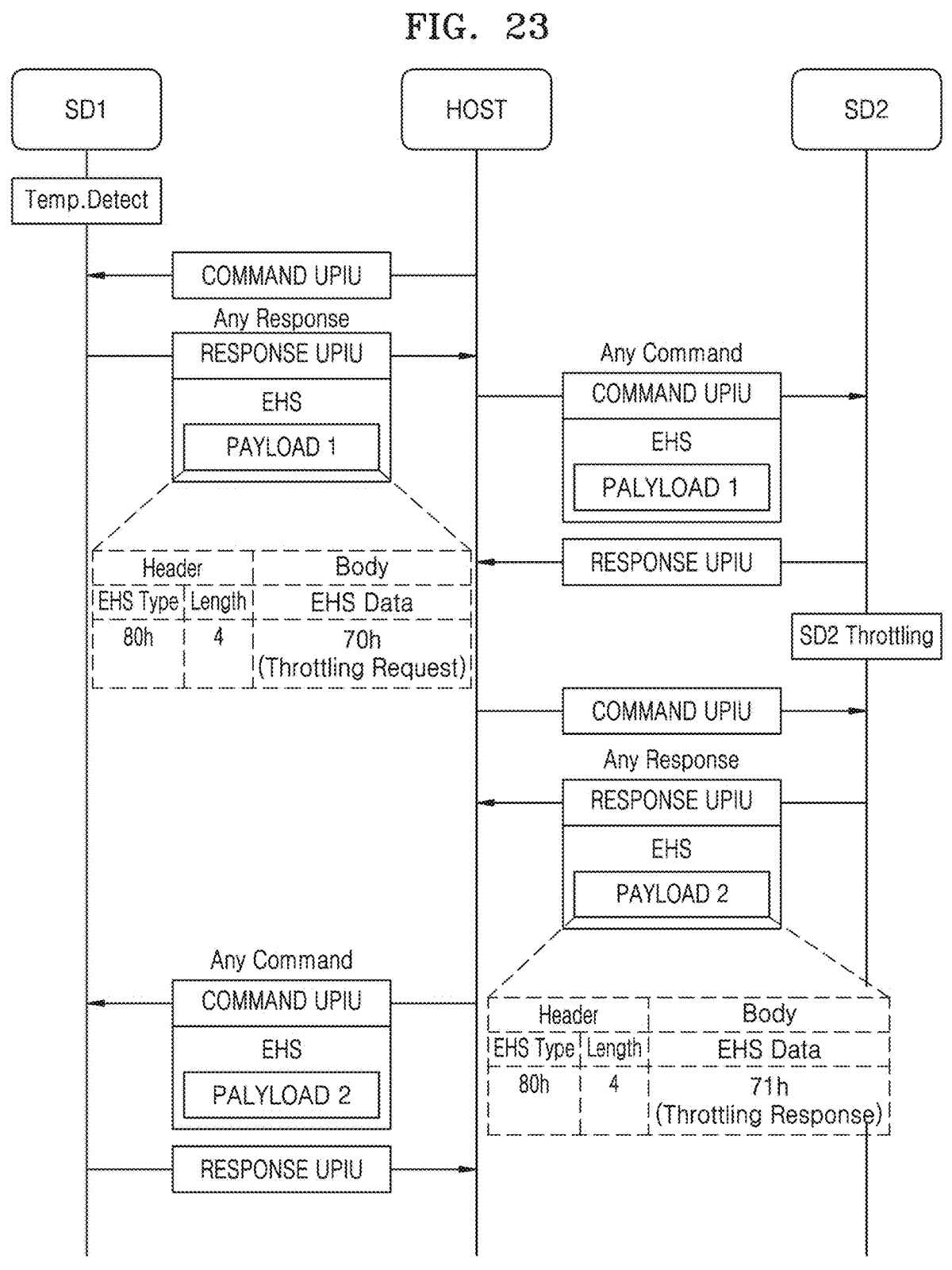

| SD1 | HOST | SD2 |
|---|---|---|

Temp.Detect

COMMAND UPIU

Any Response

RESPONSE UPIU

EHS

PAYLOAD 1

Any Command

COMMAND UPIU

EHS

PALYLOAD 1

| Header | | Body |
|---|---|---|
| EHS Type | Length | EHS Data |
| 80h | 4 | 70h (Throttling Request) |

RESPONSE UPIU

SD2 Throttling

COMMAND UPIU

Any Response

RESPONSE UPIU

EHS

PAYLOAD 2

Any Command

COMMAND UPIU

EHS

PALYLOAD 2

| Header | | Body |
|---|---|---|
| EHS Type | Length | EHS Data |
| 80h | 4 | 71h (Throttling Response) |

RESPONSE UPIU

FIG. 24

STORAGE DEVICE COMMUNICATING WITH EXTERNAL STORAGE DEVICE VIA HOST AND OPERATING METHOD OF THE STORAGE DEVICE

CROSS-REFERENCE TO RELATED APPLICATION

This application claims priority under 35 U.S.C. § 119 to Korean Patent Application Nos. 10-2023-0126409, filed on Sep. 21, 2023, and 10-2024-0003845, filed on Jan. 9, 2024, in the Korean Intellectual Property Office, the disclosures of which are incorporated by reference herein in their entireties.

BACKGROUND

The present disclosure relates to a storage device and an operating method of the storage device, and more particularly, to a storage device communicating with an external storage device and an operating method of the storage device.

Non-volatile memory may retain stored data even when power is cut off. Storage devices including flash-based non-volatile memory, such as an embedded multi-media card (eMMC), universal flash storage (UFS), solid-state drive (SSD), memory cards, or the like, are widely used, and the storage devices are useful for storing or moving large amounts of data.

A data processing system including a storage device may be referred to as a storage system, and the storage system may include a host and one or more storage devices. The host and the storage devices may be connected to each other through various interface standards and may communicate with each other using packets formatted according to an interface. There is a need for improved methods of communicating various pieces of information between the storage devices, to provide improved management efficiency and performance.

SUMMARY

One or more example embodiments provide a storage device with improved management efficiency and performance in an environment including multiple storage devices, by enabling communication between storage devices without adding a separate interface circuit to the storage device, and an operating method of the storage device.

According to an aspect of an example embodiment, an operating method of a storage device communicating with a host, includes: receiving a first packet from the host; transmitting a second packet to the host in response to the first packet, wherein the second packet includes first information to be provided to an external storage device and a device ID value that indicates the external storage device; and receiving a third packet from the host, wherein the third packet includes second information generated by the external storage device.

According to another aspect of an example embodiment, a storage device includes: a non-volatile memory core configured to store data; and a memory controller configured to communicate with a host according to a universal flash storage (UFS) interface and including a packet management circuit configured to generate a first packet corresponding to a UFS protocol information unit (UPIU) and process a second packet received from the host. The memory controller is further configured to: transmit a first UPIU to the host, the first UPIU including first information to be provided to an external storage device, and receive a second UPIU from the host, the second UPIU including second information provided from the external storage device.

According to another aspect of an example embodiment, an storage device includes: a non-volatile memory core configured to store data; and a memory controller configured to control the storage device to transmit a transmission packet corresponding to a UPIU to a host and receive a reception packet from the host according to a UFS interface. The memory controller includes: a UFS storage device interface configured to generate first information to be provided to an external storage device and a device ID indicating the external storage device; a transport protocol layer (UTP) protocol engine configured to generate a first UPIU including the first information and the device ID; and a UFS interconnection layer configured to transmit the first UPIU to the host.

BRIEF DESCRIPTION OF DRAWINGS

The above and other aspects and features will be more apparent from the following description of example embodiments, taken in conjunction with the accompanying drawings, in which:

FIGS. 10 and 11 are diagrams of a storage device communicating information in the form of a payload according to an example embodiment;

FIGS. 12 and 13 are diagrams showing internal commands communicated between storage devices are included in an extra header segment of a UFS protocol information unit (UPIU) according to an example embodiment;

FIGS. 14A, 14B, 15A, 15B, 16A, and 16B are diagrams showing device ID fields that are added to various UPIUs defined in an UFS interface according to an example embodiment;

FIGS. 17A and 17B are diagrams showing a value indicating the format of information communicated by a storage device that is included in a UPIU, according to example embodiments; and FIGS. 18 to 24 are diagrams showing communication between storage devices in various cases, according to example embodiments.

DETAILED DESCRIPTION

Figure 1:
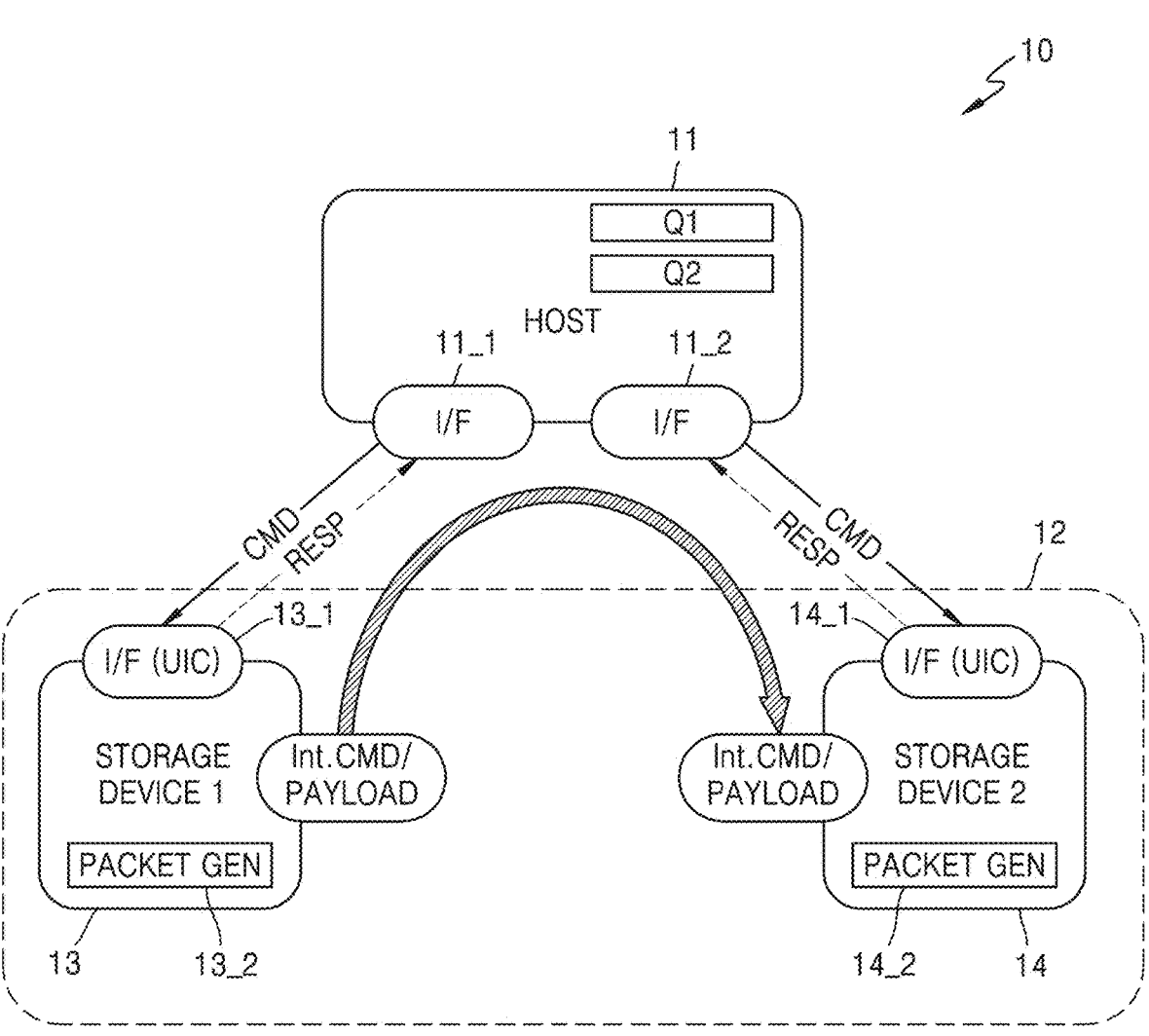
FIG. 1 is a block diagram of a storage system according to an example embodiment.

Hereinafter, example embodiments will be described with reference to the accompanying drawings. Like components are denoted by like reference numerals throughout the specification, and repeated descriptions thereof are omitted. Embodiments described herein are example embodiments, and thus, the present disclosure is not limited thereto, and may be realized in various other forms. Each example embodiment provided in the following description is not excluded from being associated with one or more features of another example or another example embodiment also provided herein or not provided herein but consistent with the present disclosure.

FIG. 1 is a block diagram of a storage system according to an example embodiment.

Referring to FIG. 1, a storage system 10 may include a host 11 and one or more storage devices, and as an example, first and second storage devices 13 and 14 are shown. In an example, the first and second storage devices 13 and 14 may be implemented in different semiconductor chips and may be mounted on one memory package 12. In addition, each of the first and second storage devices 13 and 14 may include a memory controller and one or more memory devices (or memory cores), and the memory controller may perform an access to the memory cores according to a request of the host 11. The memory controller and the memory devices may be implemented in the same semiconductor chip or may be implemented in different semiconductor chips. Each of the first and second storage devices 13 and 14 may also be referred to as a memory system in the aspect of including a memory controller and a memory device.

In relation to the communication between the host 11 and the first and second storage devices 13 and 14, the storage system 10 may use various types of interfaces, and as an example, the storage system 10 may user various interfaces, such as universal serial bus (USB), a multi-media card (MMC), embedded MMC (eMMC), peripheral component interconnection (PCI), PCI-express (PCI-E), advance technology attachment (ATA), serial-ATA, parallel-ATA, small computer small interface (SCSI), enhanced small disk interface (ESDI), integrated drive electronics (IDE), Firewire, non-volatile memory express (NVMe), universal flash storage (UFS), or the like.

According to an example embodiment, the memory package 12 may be implemented as a memory that may be built into or removable from an electronic device, and for example, the memory package 12 may be implemented in various forms, such as a UFS memory device, an eMMC, a solid state drive (SSD), a UFS memory card, compact flash (CF), secure digital (SD), micro-SD, mini-SD, extreme digital (xD), a memory stick, or the like.

In an example embodiment, a memory device of each of the first and second storage devices 13 and 14 may include a three-dimensional memory cell array, the three-dimensional memory cell array may include a plurality of NAND strings, and each NAND string may include memory cells respectively connected to word lines vertically stacked on a substrate. However, example embodiments are not limited thereto, and in some example embodiments, the memory cell array may include a two-dimensional memory cell array, and the two-dimensional memory cell array may include a plurality of NAND strings arranged in row and column directions. However, example embodiments are not limited thereto, and the memory cell array may also include various types of non-volatile memory cells, such as resistive random-access memory (ReRAM), phase change RAM (PRAM), or magnetic RAM (MRAM).

In the following description, as a UFS interface is used in the storage system 10, it is assumed that the host 11 and the first and second storage devices 13 and 14 generate and communicate packets according to the protocol of the UFS interface.

Each of the host 11 and the first and second storage devices 13 and 14 may include one or more interface circuits, and as an example, the host 11 may include first and second host interface circuits 11_1 and 11_2. In addition, the first storage device 13 may include a first device interface circuit 13_1, the second storage device 14 may include a second device interface circuit 14_1, the host 11 may communicate with the first storage device 13 through the first host interface circuit 11_1 and communicate with the second storage device 14 through the second host interface circuit 11_2. An interface circuit provided in each of the host 11 and the first and second storage devices 13 and 14 may include a UFS interconnection layer (UIC) according to the UFS interface. In addition, the UIC may include a link layer, such as a UniPro defined by MIPI alliance, and a physical layer, such as M-PHY or the like.

The host 11 and the first and second storage devices 13 and 14 may communicate various types of UFS protocol information units (UPIU) as packets according to the UFS interface, and the UPIU may include a command (CMD) UPIU and a response (RESP) UPIU. As an example of an operation, the host 11 may transmit a CMD UPIU to the first storage device 13 and the second storage device 14, and the first storage device 13 and the second storage device 14 may transmit RESP UPIUs to the host 11 in response to the CMD UPIU.

According to an example embodiment, in addition to the requests/responses with the host 11, the first and second storage devices 13 and 14 may transmit and receive various types of information to/from each other. In addition, the various types of information may be transmitted via the host 11, and as an example, when it is assumed that the first storage device 13 transmits information to the second storage device 14, the first storage device 13 may transmit information having a certain format to the host 11, and the host 11 may transmit the received information to the second storage device 14.

Information that is communicated between storage devices may have various types of formats, and as an example, the information may be transmitted in the form of commands, which are distinct from the CMD communicated with the host and may be referred to as an internal command (Int. CMD). Alternatively, the information may be transmitted in the form of payload. The second storage device 14 may perform internal management operations based on information in the form of an internal command or a payload from the first storage device 13. When a response is required, the second storage device 14 may provide a response in the form of an internal command or a payload to the first storage device 13 via the host 11.

Each of the first and second storage devices 13 and 14 may include a packet generator (i.e., packet generation circuit), and each packet generator may generate a packet according to the UFS interface. For example, each of a first packet generator 13_2 of the first storage device 13 and a second packet generator 14_2 of the second storage device 14 may generate a RESP UPIU in response to a CMD UPIU from the host.

As an example of an operation in which the first storage device 13 provides a payload to the second storage device 14, the first packet generator 13_2 may transmit a packet (e.g., a RESP UPIU) corresponding to a response to the host 11, and the payload to be provided to the second storage device 14 may be included in the packet. As an example, a packet according to a certain interface may include a header region, an extra header segment (EHS) region, and a payload region, and a payload communicated between storage devices may be included in at least a portion of the header region and the EHS region of the packet. The header region and the EHS region of the packet may include a region (for example, a reserved region) that is not used in communication with the host 11, and the payload communicated between the storage devices may be included in the reserved region of the packet transmitted to the host.

In an example embodiment, the host 11 may include one or more queues that store information communicated between the first and second storage devices 13 and 14. As an example, when an internal command/payload and a response corresponding to the internal command/payload are communicated between storage devices, the host 11 may include a first queue Q1 storing internal commands/payloads provided from the storage devices and a second queue Q2 storing internal responses or payloads corresponding to the internal commands/payloads. However, this is an example embodiment, and the host 11 may also store Int. CMD/internal responses and payloads from the storage devices in the same queue. The host 11 may sequentially fetch information stored in the first queue Q1 and the second queue Q2, and the fetched information may be transmitted to the storage devices.

In an example embodiment, a storage device providing internal commands or internal responses may be referred to a source storage device, and a storage device receiving the internal commands or internal responses via the host 11 may be referred to as a target storage device. For example, in the case where the first storage device 13 provides an internal command or payload to the second storage device 14, the first storage device 13 may be a source storage device, and the second storage device 14 may be a target storage device. In addition, in the case where the second storage device 14 provides an internal response or payload (or a response payload) to the first storage device 13, the second storage device 14 may be a source storage device, and the first storage device 13 may be a target storage device.

In an example embodiment, a packet transmitted and received between the host 11 and the first and second storage devices 13 and 14 may further include information related to an internal command or payload communicated between the first and second storage devices 13 and 14. For example, when the first storage device 13 transmits a packet including an internal command to the host 11, a device ID value indicating a target storage device for which the internal command is to be provided may be included in the packet, and a value indicating the type of format of the internal command may also be included in the packet. In addition, a device ID value indicating a source storage device providing the internal command may also be included in the packet. The host 11 may perform an operation of transmitting an internal command based on various types of information included in the packet. For example, when the first storage device 13 transmits, to the host 11, a packet including an internal command and a device ID value indicating the second storage device 14 as a target storage device, the host 11 may identify the second storage device as the target storage device based on the device ID value and transmit the internal command to the second storage device 14.

According to example embodiments, as internal commands or payloads communicated between storage devices are transmitted via the host 11, additional interface circuits are not needed in the storage devices, and thus the implementation areas and manufacturing complexity of the storage devices may be reduced. In addition, a method of expanding capacity and increasing data bandwidth by using two or more storage devices as a redundant array of inexpensive disks 0 (RAIDO) has been proposed. However, according to example embodiments, multiple storage devices may communicate internal commands and payloads, and thus the multiple storage devices may synchronously perform various types of internal management. For example, performance throttling may be synchronously processed between multiple storage devices by using internal commands, and background operations such as garbage collections or the like may also be synchronously processed.

In addition, the host 11 may manage power for the first and second storage devices 13 and 14, and as an example, the host 11 may manage entry into hibernation stopping data access to the first and second storage devices 13 and 14. When direct communication is performed between the first and second storage devices 13 and 14, restrictions may arise in managing the hibernation entry/exit of the host 11. Conversely, according to example embodiments, because communication between the first and second storage devices 13 and 14 is performed via the host 11, the host 11 may perform power management by preventing communication between the first and second storage devices 13 and 14 during a hibernation section, and may perform transmission of internal commands and payloads stored in the first queue Q1 and the second queue Q2 after the hibernation section.

Figure 2:
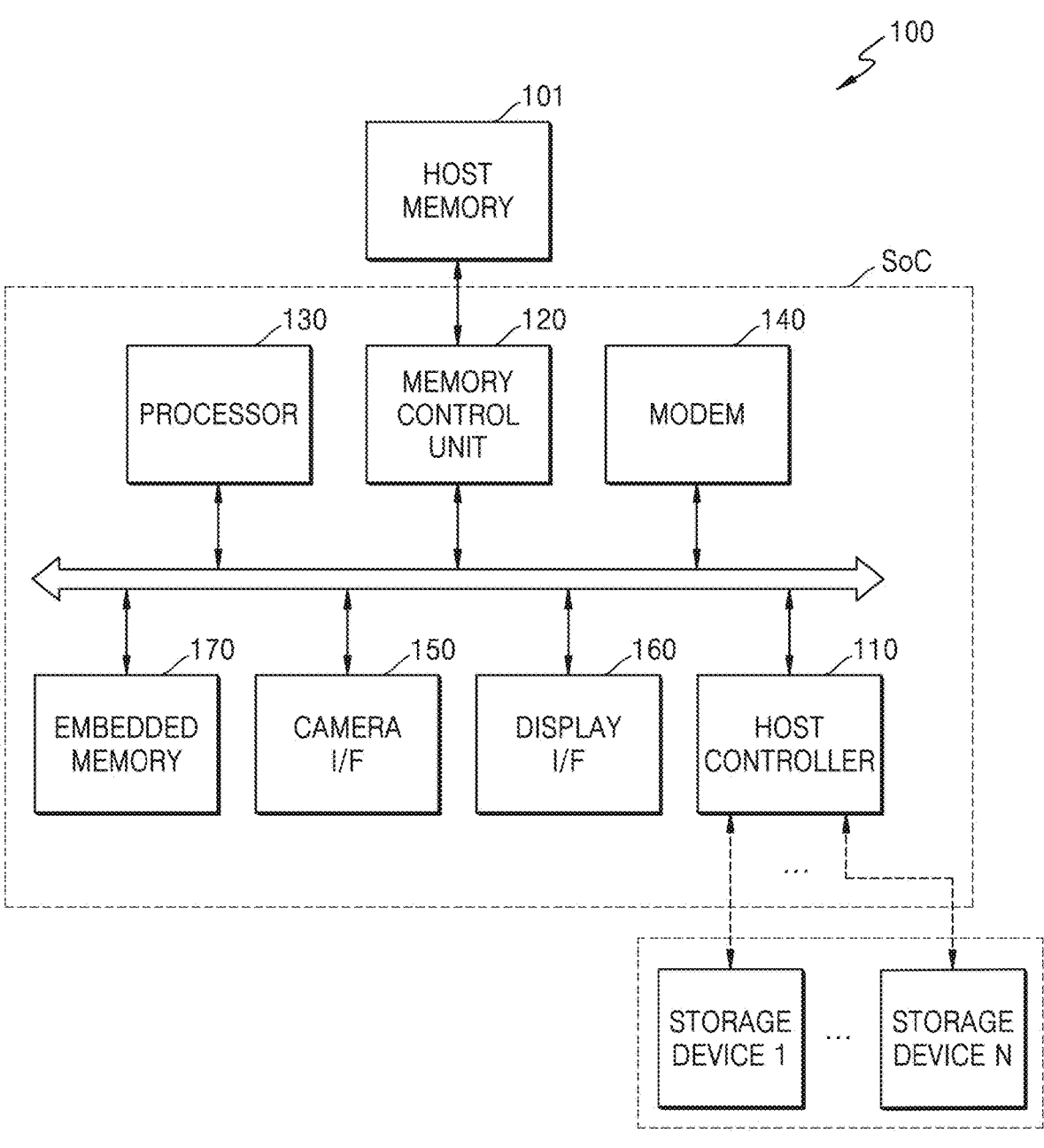
FIG. 2 is a block diagram of a host according to an example embodiment.

FIG. 2 is a block diagram showing an example of a host, such as the host shown in FIG. 1. In the example of FIG. 2, the host 100 may include a system-on-chip (SoC) and a host memory 101, and a processor 130 controls a memory operation by executing software stored in the host memory 101 is shown, but the host memory 101 may be provided inside the SoC or an embedded memory 170 may perform functions as the host memory 101. In addition, the SoC may be an application processor (AP).

Referring to FIG. 2, the SoC may include one or more modules as intelligent properties (IP). For example, the SoC may include a host controller 110, a memory control unit 120, the processor 130, a modem 140, a camera interface 150, a display interface 160, and the embedded memory 170.

The processor 130 may control the overall operation of the SoC. As an example, software (e.g., a host application and a device driver) for managing data write/read operations for storage devices may be loaded to the host memory 101, and the processor 130 may manage the data write/read operations by executing the software. The host memory 101 may be implemented as a volatile memory or non-volatile memory, and may include, for example, volatile memory such as dynamic random-access memory (DRAM) and/or static RAM (SRAM), or the like.

According to an example embodiment, as the SoC includes the modem 140, the camera interface 150, the display interface 160, or the like, the SoC may perform a camera control operation, a display control operation, a communication operation, or the like. In FIG. 2, as the modem 140 is included in the SoC corresponding to an AP, the SoC may be referred to as a ModAP.

The host controller 110 may transmit and receive packets to/from a storage device, according to example embodiments described above. The host controller 110 may generate a packet according to a certain interface and communicate the generated packet to multiple storage devices in response to an access request generated by a host application layer of the SoC. As an example, a memory package in an example embodiment may include first to N-th storage devices (N is an integer of 2 or more), and the host controller 110 may include first to N-th interface circuits (e.g., UICs) corresponding to the first to N-th storage devices.

According to an example embodiment, the first to N-th storage devices may communicate information, such as internal commands, internal responses, payloads, or the like, with each other, and the communication between the first to N-th storage devices may be performed via the host controller 110. In this regard, the internal commands/internal responses, payloads, or the like from the storage devices may be stored in a queue of the SoC or a queue of the host memory 101.

Figure 3:
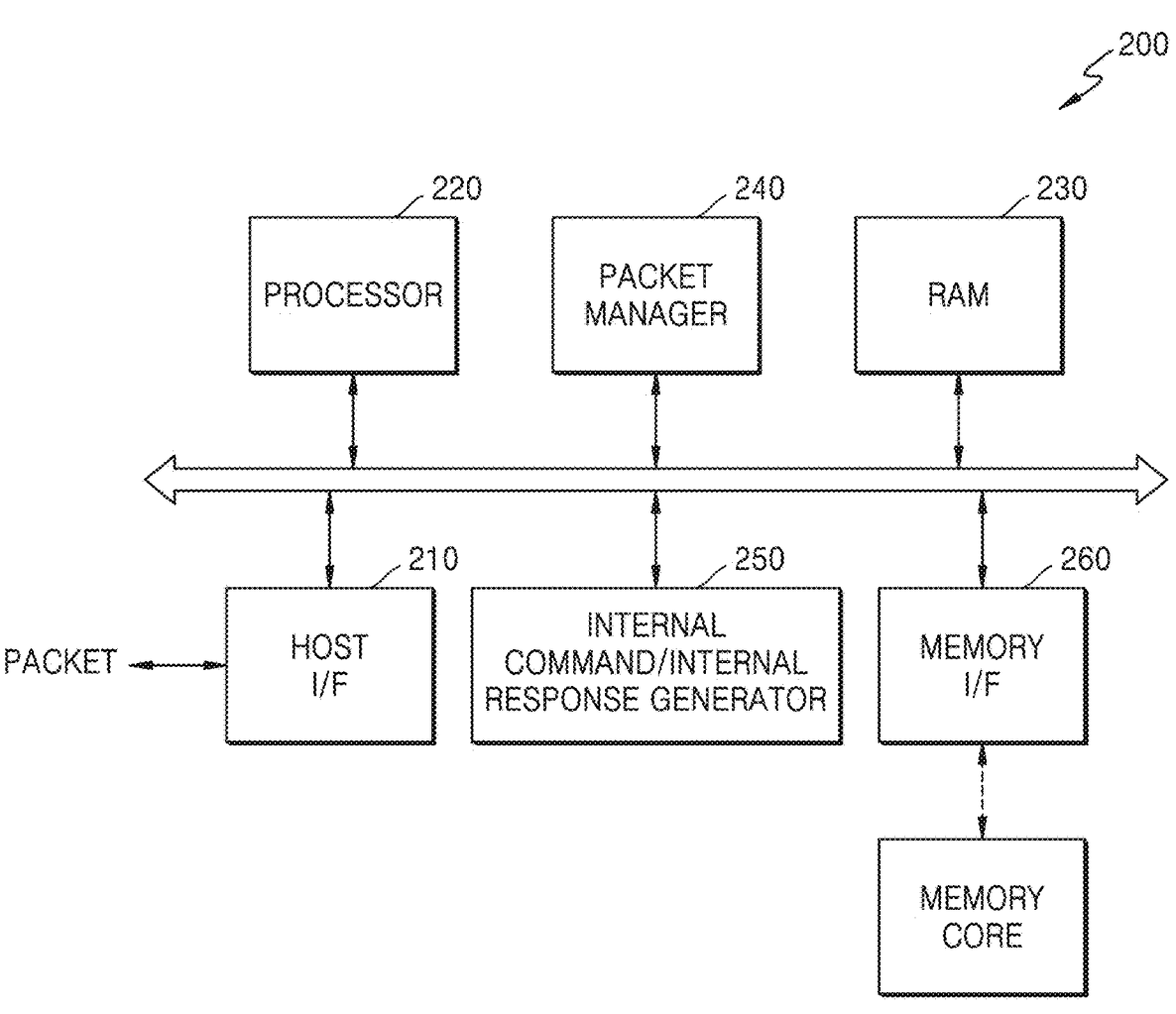
FIG. 3 is a block diagram of a storage device according to an example embodiment.

FIG. 3 is a block diagram showing an example of a storage device according to an example embodiment.

Referring to FIG. 3, the storage device may include a memory controller 200 and a memory core. The memory controller 200 may include a host interface 210, a processor 220, RAM 230, a packet manager (i.e., a packet management circuit) 240, an internal commands/internal responses generator 250, and a memory interface 260. In addition, the RAM 230 may be used as a working memory, and the processor 220 may control the overall operation of the memory controller 200 by executing firmware loaded to the RAM 230. The RAM 230 may be implemented as various types of memory, for example, at least one of the resistant memory devices, such as cache memory, DRAM, SRAM, PRAM, or the like. As an example of the firmware, a flash translation layer (FTL) may be loaded to the RAM 230, and various functions related to a flash memory operation may be performed by driving the FTL.

The host interface 210 may communicate with a host through various types of interfaces, according to an example embodiment. The host interface 210 may transmit a packet to the host and receive a packet from the host, and according to an example embodiment, internal commands/internal responses or payloads provided from any one storage device may be included in the packet.

The packet manager 240 may generate a packet to be transmitted to the host according to a protocol of a certain interface, or may extract various types of information from a packet received from the host. In addition, the internal commands/internal responses generator 250 may generate an internal command to be provided to another storage device, or may generate an internal response responding to the internal command provided from the other storage device. The packet manager 240 may receive an internal command or an internal response from the internal commands/internal responses generator 250, and may generate a packet including the internal command or the internal response in a particular region (e.g., a header region and/or EHS region) of the packet. In addition, the packet manager 240 may receive various types of information (e.g., an ID of a target storage device, format information of the internal command, or the like) related to the internal command or internal response from the internal commands/internal responses generator 250, and may include the various types of information in a packet.

The memory interface 260 may provide a physical connection between the memory controller 200 and the memory core. For example, the memory controller 200 may generate a command/address and a control signal for controlling a memory operation and may provide the generated command/address and the control signal to the memory core through the memory interface 260. In addition, write data and read data by the memory operation may be transmitted and received between the memory controller 200 and the memory core through the memory interface 260.

Although it is described that the internal commands/internal responses generator 250 generates internal commands and internal responses having certain formats, when information in the form of payloads is communicated between storage devices, the internal commands/internal responses generator 250 may also generate various pieces of information such as payloads to be transmitted and received between the storage devices, device IDs related to the payloads, format information, or the like.

Figure 4:
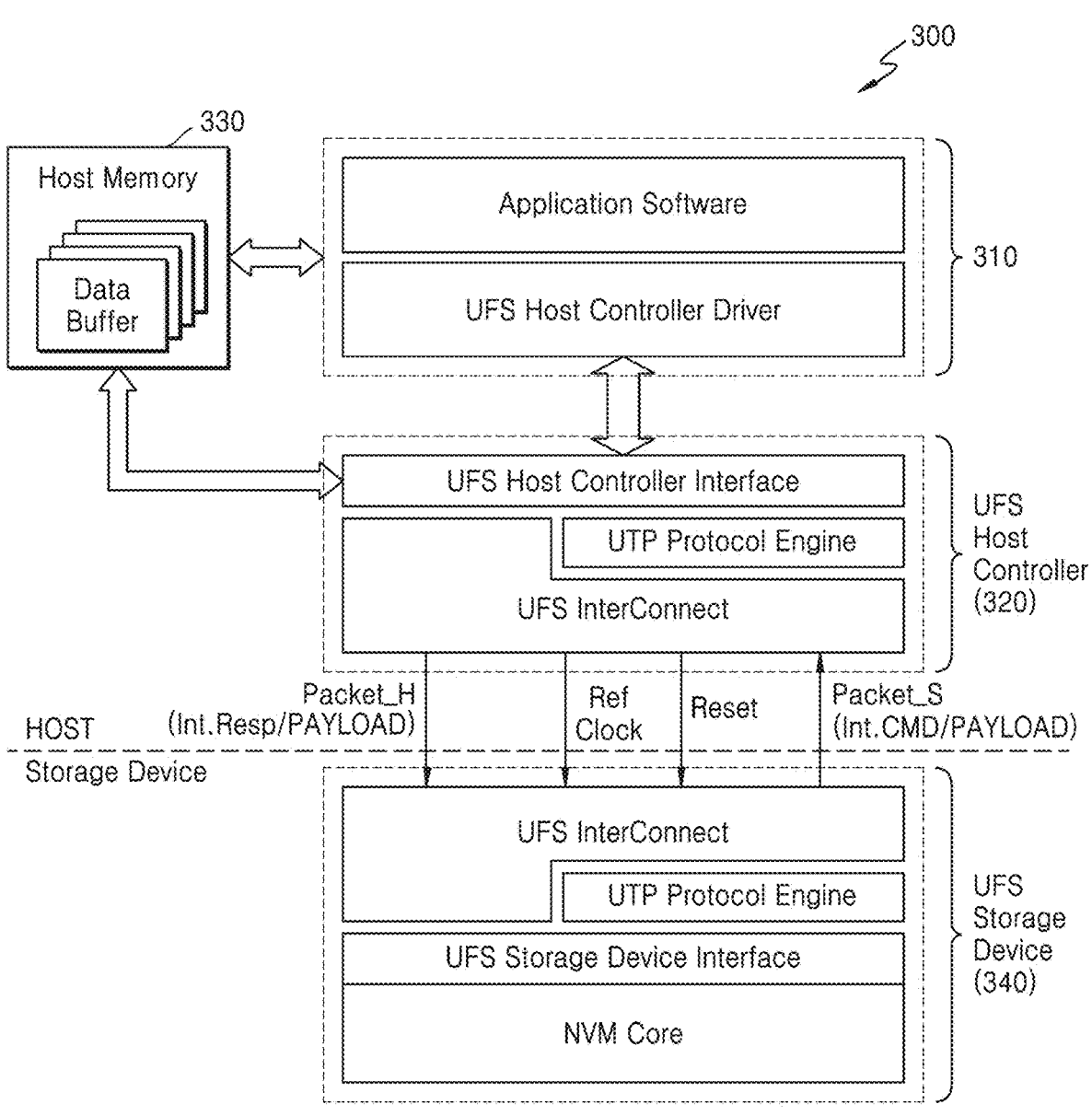
FIG. 4 is a block diagram of a storage system to which a universal flash storage (UFS) interface is applied according to an example embodiment.

FIG. 4 is a block diagram showing an example of a storage system to which a UFS interface is applied according to an example embodiment.

Referring to FIG. 4, a host of a storage system 300 may be referred to as a UFS host, and a storage device may be referred to as a UFS storage device. The UFS host may include a software module 310, a UFS host controller 320 and a host memory 330 corresponding to hardware modules, as components thereof. The software module 310 may include application software and a UFS host controller driver. The application software may include various application programs that run on the UFS host, the UFS host controller driver may be configured to manage the driving of peripheral devices that may be used by being connected to the UFS host, and a data management operation, such as writing and reading data with respect to a storage device, may be performed by executing the UFS host controller driver. The application software and the UFS host controller driver may be loaded to the host memory 330 shown in FIG. 4, or may be loaded to another operational memory within the UFS host and executed by a processor.

The UFS host controller 320 may correspond to the host controller 110 shown in FIG. 2, and may include a UFS host controller interface (UFS HCI), a UTP protocol engine, and a UIC. The UFS HCI may receive a request generated by the UFS host controller driver and transmit the request to the UTP protocol engine, or may provide a data access result transmitted from the UTP protocol engine to the UFS host controller driver. The UTP protocol engine may provide services for upper layers (or application layers), and, as an example, may generate a packet or extract information from the packet.

In addition, the UIC may communicate with a UFS storage device 340, and as an example, the UIC may include a link layer and a physical (PHY) layer. The link layer may be an MIPI UniPro, and the PHY layer may be an MIPI M-PHY. In addition, according to the UFS interface, the UFS host may provide a reference clock (Ref Clock) and a reset signal to the UFS storage device 340.

The UFS storage device 340 may include a memory controller and a memory core. According to an example embodiment, in the UFS interface, the memory controller may be referred to as a storage controller, and the memory controller may include a UIC, a UTP protocol engine, and a UFS storage device interface. In addition, the memory core may include a non-volatile memory core (NVM Core).

Internal commands/internal responses or payloads according to an example embodiment may be included in a first packet Packet_H transmitted from the UFS host to the UFS storage device 340 and a second packet Packet_H transmitted from the UFS storage device 340 to the UFS host. The UFS host controller 320 may refer to a value of a field of a header region included in a received packet to determine whether an internal command/internal response or a payload is included in the received packet. As an example, when a device ID value indicating a storage device (e.g., a target storage device) is included in a header region of a received packet, a host may transmit an internal command/internal response or a payload to the storage device corresponding to the device ID value.

Various types of packets may be defined by the UFS interface, and internal commands/internal responses or payloads according to an example embodiment may be included in the various types of packets. As an example, a packet according to the UFS interface may be a UPIU, and as a type of UPIU, packets such as a command UPIU for read and write requests, a response UPIU, a DATA IN UPIU including read data, a DATA OUT UPIU including write data, a task management request UPIU, a task management response UPIU, a query request UPIU, a query response UPIU, a ready to transfer (RTT) UPIU, or the like may be provided.

For example, an operation of generating internal commands and adding the internal commands and information related to the internal commands to a packet may be performed through various layers. As an example, the UFS storage device interface of the UFS storage device 340 may manage command sets related to internal commands, and may provide information related to the internal commands together with internal commands to be provided to another storage device to the UTP protocol engine. The UTP protocol engine may generate a packet including an internal command according to example embodiments, and the internal command and information related to the internal command may be added to a header region and/or an EHS region of the packet.

Similarly, in the case where a host transmits a packet to the UFS storage device 340, internal commands may be stored in a queue within the host, a UTP protocol engine of the host may generate a packet to be transmitted to the UFS storage device 340, and the internal commands fetched from the queue and information related to the fetched internal commands may include in the packet to be transmitted to the UFS storage device 340.

Hereinafter, a particular communication example between a host and a storage device according to example embodiments is described. Below, a host and a storage device to which a UFS interface is applied will be described, but as described above, example embodiments may be applied to other various types of interfaces in addition to the UFS interface.

Figure 5:
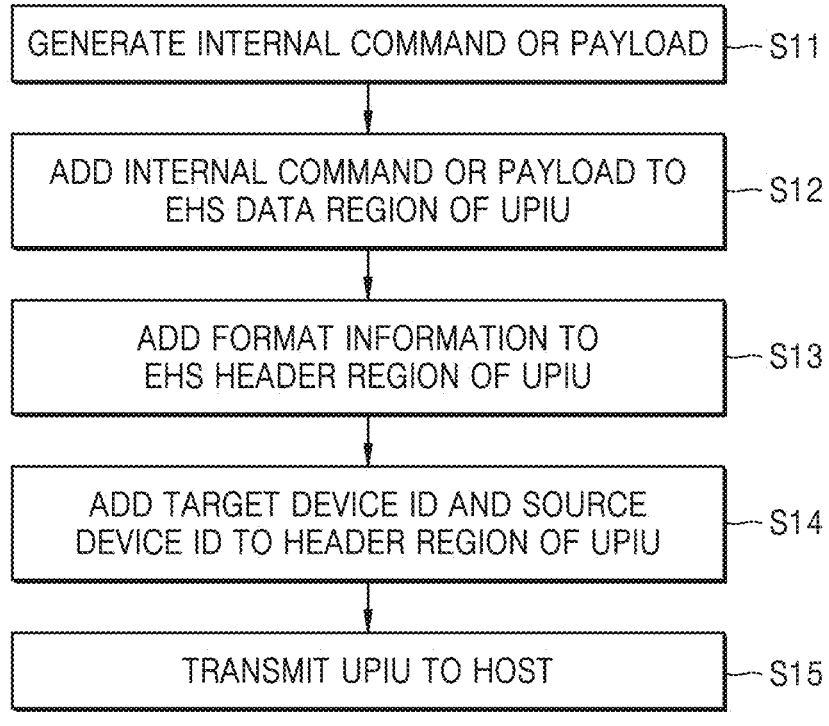
FIGS. 5 to 7 are flowcharts illustrating an operating method of a storage device according to example embodiments.
Figure 6:
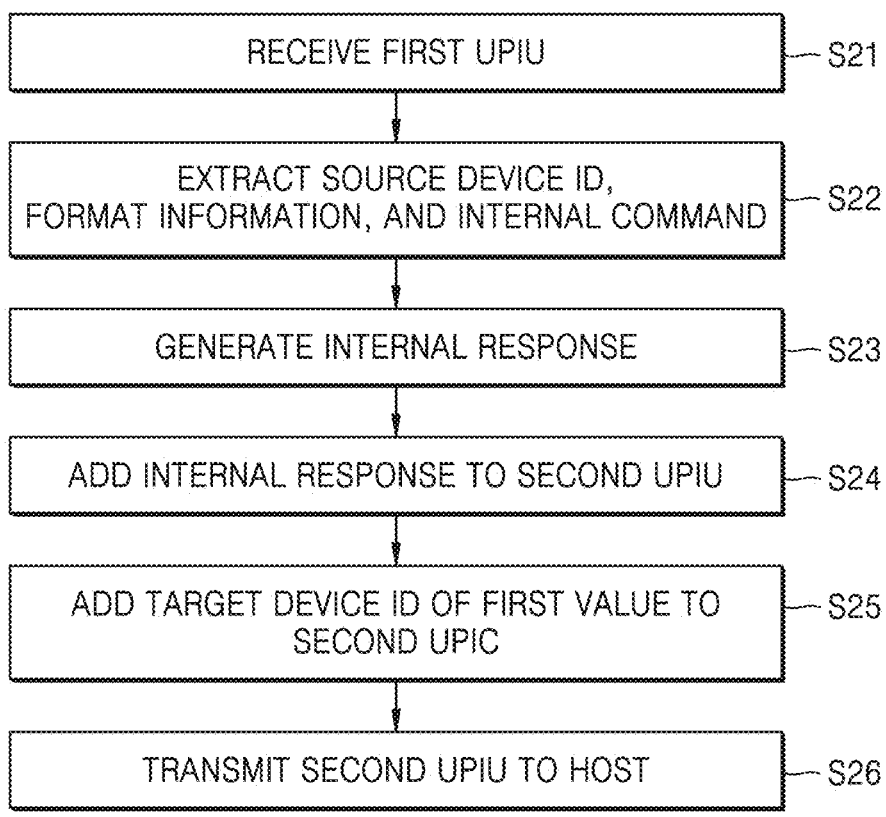
Figure 7:
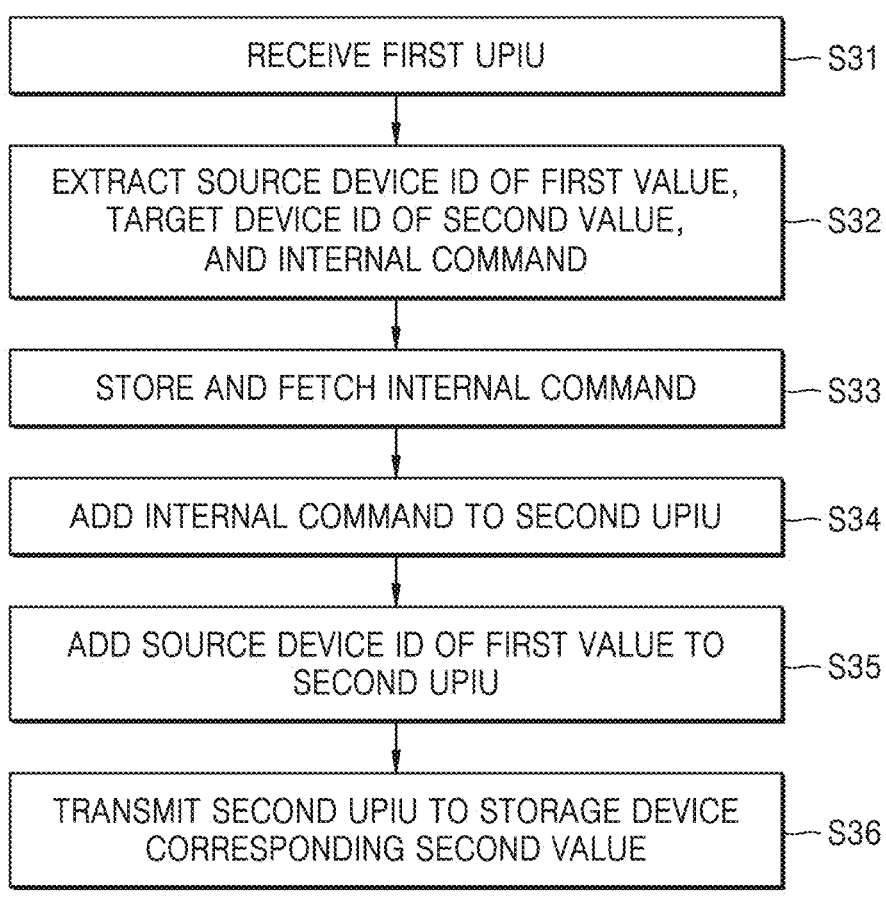

FIGS. 5 to 7 are flowcharts illustrating an operating method of a storage system according to example embodiments. FIGS. 5 and 6 show an operating method of a storage device, and FIG. 7 shows an operating method of a host.

As shown in FIG. 5, the storage device may generate an internal command or payload to be provided to another storage device in S11, and may generate a UPIU including the internal command or payload. As an example, the UPIU may include a header region and an EHS region, and the EHS region may include an EHS header region and an EHS data region.

The storage device may add the internal command or payload to the EHS data region in S12. In addition, the storage device may add format information indicating the format of the internal command or payload to the EHS header region of the UPIU in S13. Also, the storage device may add a target device ID indicating a target storage device and a source device ID indicating a source storage device to the header region of the UPIU in S14. In addition, the storage device may transmit the UPIU configured above to the host in S15.

Referring to FIG. 6, the storage device may receive a first UPIU from the host in S21. The storage device may extract various types of information from the first UPIU, and as an example, the storage device may extract a source device ID having a first value and may also extract the internal command and format information thereof in S22. The storage device may perform processing of the internal command, and may determine whether generation of internal responses is needed. As an example, the storage device may generate an internal response in S23 and add the generated internal response to a second UPIU in S24.

In addition, the storage device may determine an external storage device to be provided with the internal response according to the source device ID having the first value, and may add a target device ID having the first value indicating the external storage device to a second UPIU in S25. Also, the storage device may transmit the second UPIU configured above to the host in S26.

Referring to FIG. 7, the host may receive the first UPIU from the storage device in S31. The host may extract various types of information from the first UPIU, and as an example, the host may extract a source device ID having a first value, a target device ID having a second value, and an internal command in S32. The host may store the internal command in an internal queue and fetch the internal command from the internal queue for transmission of internal command in S33. Also, the various types of information extracted from the first UPIU may also be stored inside the host.

The host may generate a second UPIU and add the internal command to the second UPIU in S34. In addition, the host may add the source device ID having the first value to the second UPIU in S35. Also, the host may transmit the second UPIU configured above, and as an example, the host may transmit the second UPIU to a storage device having a device ID corresponding to the second value in S36.

Hereinafter, a particular communication example between a host and first and second storage devices, according to example embodiments, is described. In the following, a communication example between two storage devices is described, but as described above, example embodiments may be applied to the communication between three or more storage devices. In addition, in the following description, it is assumed that a UFS interface is applied to a storage system among various types of interfaces.

Figure 8:
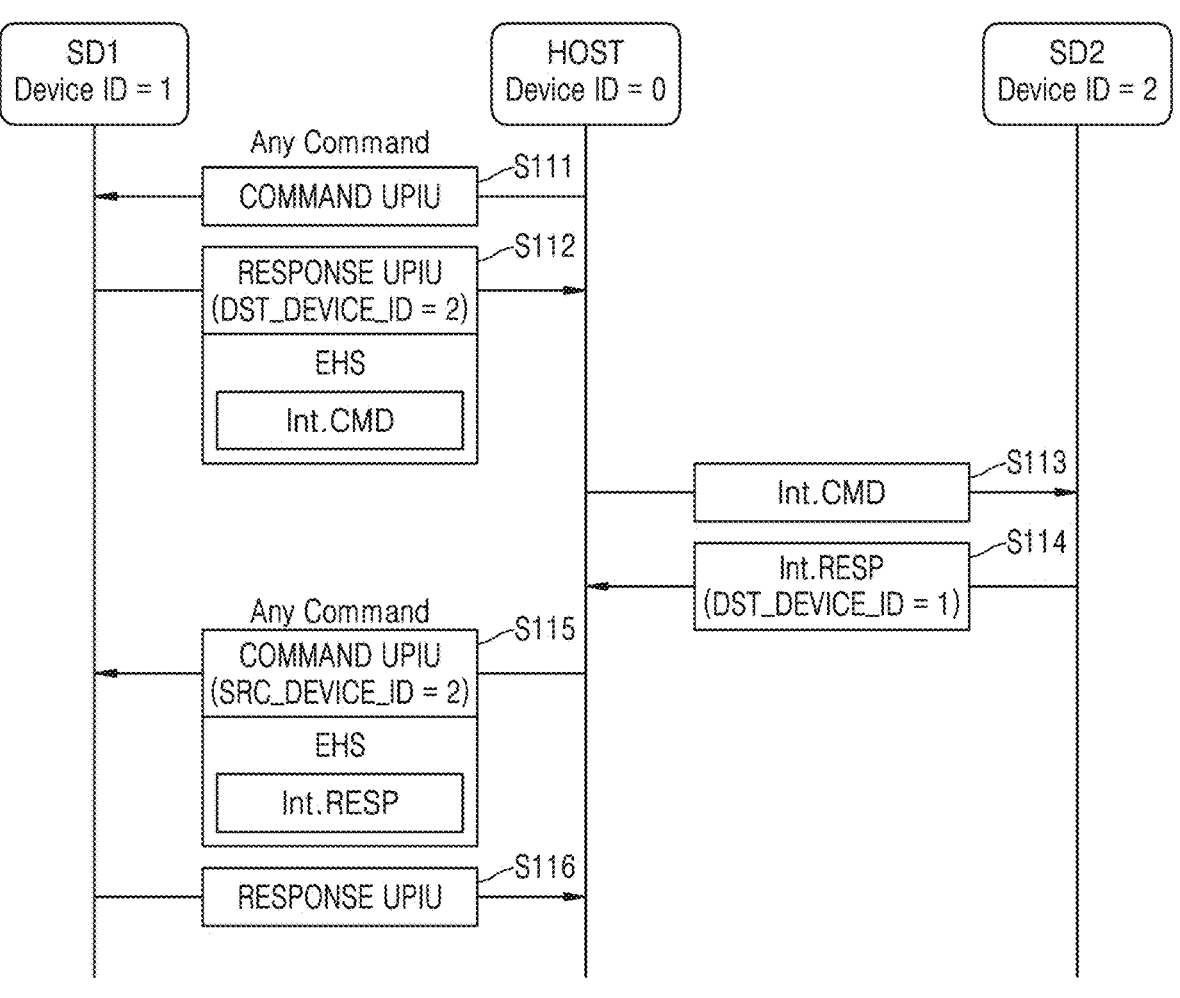
FIG. 8 shows a case where a storage device performs communication in an internal command/internal response format according to an example embodiment.

FIG. 8 shows a case where a storage device performs communication in an internal command/internal response format.

Referring to FIG. 8, a device ID value may be assigned to each of a host and first and second storage devices SD1 and SD2, and as an example, device ID values corresponding to "0," "1," and "2" may be respectively assigned to the host, the first storage device SD1, and the second storage device SD2. In the example of FIG. 8, the first storage device SD1 and the second storage device SD2 may communicate internal commands/internal responses with each other. When the first storage device SD1 and the second storage device SD2 communicate an internal command/internal response having a format according to the UFS interface, the internal command/internal response may respectively correspond to a command UPIU and a response UPIU. However, in an example embodiment, the internal command/internal response may also have formats according to different types of interfaces. As an example, the internal command may be a UFS-only command or a command included in a command set according to an SCSI interface. Alternatively, the internal command may also be implemented in the form of an upper-level host command, or may be implemented as a lower-level command defined in the Inter-Process Communication (IPC) negotiated between devices.

The first storage device SD1 may receive a command UPIU from the host in S111, and may transmit a response UPIU including an internal command (Int. CMD) to the host in response to the received command UPIU. The response UPIU may include a header region and an EHS region, and as an example, the internal command (Int. CMD) may be included in the EHS region. In addition, at least one piece of information related to the internal command (Int. CMD) may be included in the response UPIU, and as an example, a device ID value (i.e., DST_DEVICE_ID=2) indicating the second storage device SD2 as a target storage device to be provided with the internal command (Int. CMD) may be included in the header region of the response UPIU.

The host may receive the response UPIU and store the internal command (Int. CMD) extracted from the response UPIU in a queue within the host. In addition, the host may transmit the internal command (Int. CMD) to the second storage device SD2 based on the device ID value included in the response UPIU in S113. In an example embodiment, as shown in FIG. 8, when the internal command (Int. CMD) corresponds to a UPIU according to the UFS interface, the host may transmit the internal command (Int. CMD) to the second storage device SD2 without including the internal command (Int. CMD) in a separate command UPIU. In addition, the second storage device SD2 may generate a UPIU corresponding to an internal response (Int. RESP) that responds to the internal command (Int. CMD) and transmit the generated UPIU to the host in S114. The second storage device SD2 may include the device ID value (i.e., DST_DEVICE_ID=1) indicating the first storage device SD1 to be provided with the internal response (Int. RESP) in the internal response (Int. RESP), and as an example, the device ID value may be included in a header region of the internal response (Int. RESP).

The host may include the internal response (Int. RESP) in any UPIU to be provided to the first storage device SD1, and as an example, the host may include the internal response (Int. RESP) in an EHS region of a command UPIU to be provided to the first storage device SD1. The first storage device SD1 may confirm that the provision of the internal command (Int. CMD) to the second storage device SD2 has been normally completed through the internal response (Int. RESP). In addition, the first storage device SD1 may transmit, to the host, a response UPIU that responds to the command UPIU from the host in S116.

When the internal command (Int. CMD) or the internal response (Int. RESP) has a format according to a protocol such as the UFS interface or the like, each of the internal command (Int. CMD) or the internal response (Int. RESP) may include a header region including multiple fields. In an example embodiment, information indicating the device ID value or the format type of the internal command may be included in the internal command (Int. CMD)/internal response (Int. RESP) together with the UPIU being communicated between the host and the storage device. For example, as shown in FIG. 8, in the response UPIU transmitted by the first storage device SD1 to the host, information indicating the device ID value or the format type of the internal command may be included in the internal command (Int. CMD) together with the response UPIU. In addition, when the second storage device SD2 directly transmits the internal response (Int. RESP) to the host, the device ID value (i.e., DST_DEVICE_ID=1) indicating the first storage device SD1 corresponding to a target storage device may be included in the header region of the internal response (Int. RESP).

Also, in an example embodiment, in the communication between storage devices, a device ID value indicating a source storage device may be further included in a packet. As an example, the device ID value indicating the source storage device may be included in the internal command (Int. CMD)/internal response (Int. RESP) together with the UPIP being communicated between the host and the storage device. For example, the second storage device SD2 may determine a storage device to be provided with the internal response (Int. RESP) through the device ID value of the first storage device SD1, which is included in the internal command (Int. CMD). In addition, the first storage device SD1 may determine a storage device providing the internal response (Int. RESP) based on a value included in the packet and/or the internal command (Int. CMD) from the host. For example, as shown in S115 of FIG. 8, the host may include the device ID value (i.e., SRC_DEVICE_ID=2) of the second storage device SD2 corresponding to a source storage device providing the internal response (Int. RESP) in a header region of the command UPIU when transmitting the command UPIU to the first storage device SD1.

Above, a case in which the internal command (Int. CMD) and the internal response (Int. RESP) are directly transmitted and received in the communication between the host and the second storage device SD2 without being included in a packet is described, however example embodiments are not limited thereto. For example, even when the first storage device SD1 and the second storage device SD2 communicate a command/response having a certain format, the host may also communicate a UPIU including the internal command (Int. CMD) and the internal response (Int. RESP) with the second storage device SD2.

Figure 9:
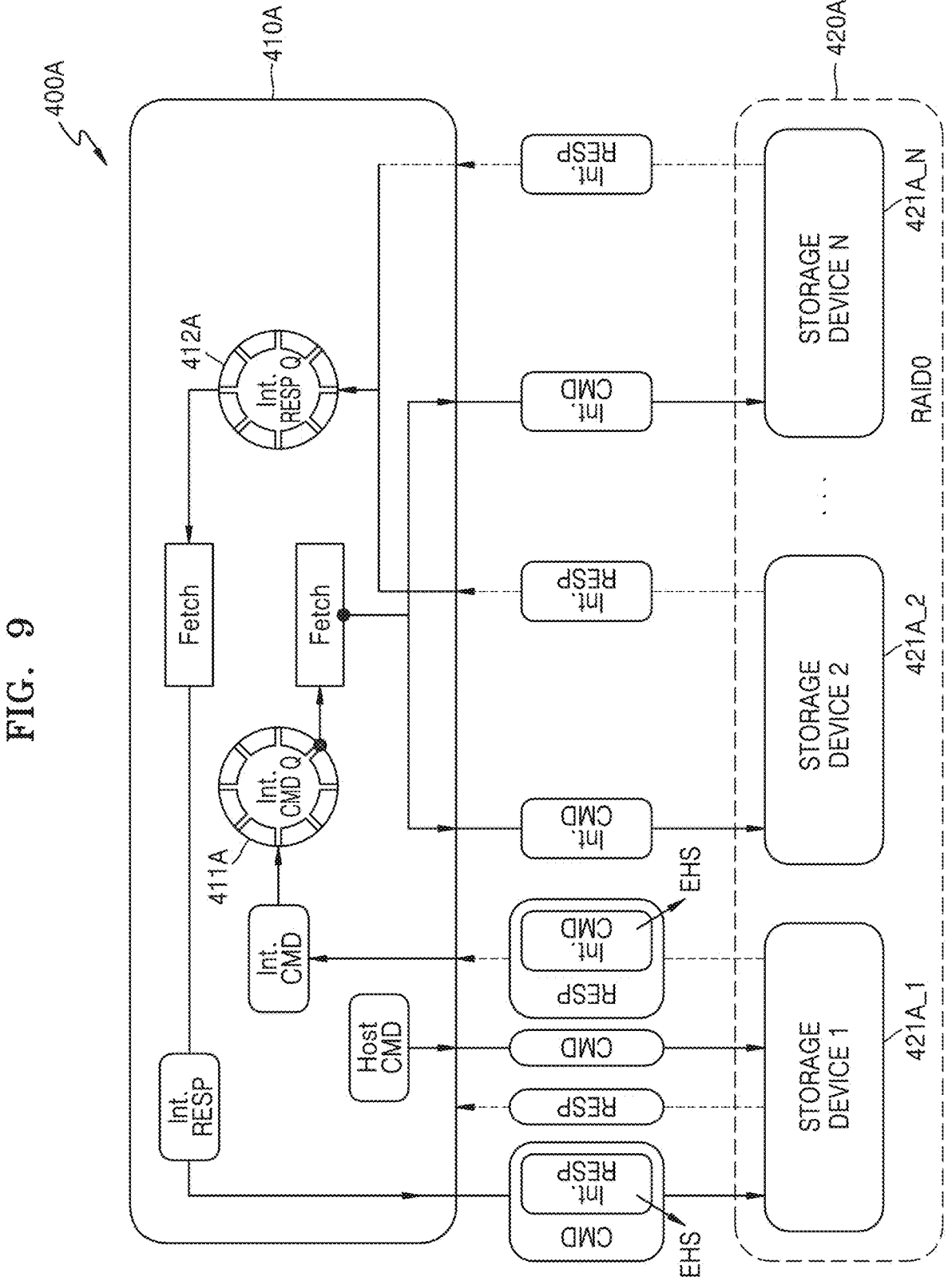
FIG. 9 shows a storage system according to an example embodiment.

FIG. 9 shows an example of a storage system according to example embodiments. For example, the storage system may perform operations consistent with those shown in FIG. 8.

Referring to FIG. 9, a storage system 400A may include a host 410A and a memory package 420A. The memory package 420A may include multiple storage devices, including first to N-th storage devices 421A_1 to 421A_N. In addition, the host 410A may include a first queue 411A storing internal commands and a second queue 412A storing internal responses.

For example, when the first storage device 421A_1 provides an internal command Int. CMD to another storage device, the first storage device 421A_1 may include the internal command Int. CMD in an EHS region of any UPIU to be transmitted to the host. The host 410A may store the internal command Int. CMD in the first queue 411A, and may fetch the internal command Int. CMD stored in the first queue 411A and transmit the fetched internal command Int. CMD to another storage device. For example, when the internal command Int. CMD has a format that may be independently transmitted, the host 410A may transmit the internal command Int. CMD to a storage device selected from among the second to N-th storage devices 421A_2 to 421A_N. In addition, the host 410A may receive an internal response Int. RESP from a storage device and store the received internal response Int. RESP in the second queue 412A.

The host 410A may fetch the internal response Int. RESP from the second queue 412A and transmit the fetched internal response Int. RESP to the first storage device 421A_1. As an example, the host 410A may include the internal response Int. RESP in a command UPIU as any UPIU to be transmitted to the first storage device 421A_1.

According to the above, transmission of internal commands in various methods may be performed based on a value of a target device ID included in a packet. For example, when an internal command or an internal response is not included in a packet, a target device ID may have a value of "0" referring to the host or another defined value. Alternatively, when multiple target device ID values are included in a packet, internal commands may be provided together to two or more storage devices among multiple storage devices. Alternatively, when a target device ID of a certain value is defined, and the target device ID of the particular value is included in a packet, a storage system may be implemented so that internal commands are broadcasted to all storage devices except a source storage device providing an internal command.

Figure 10:
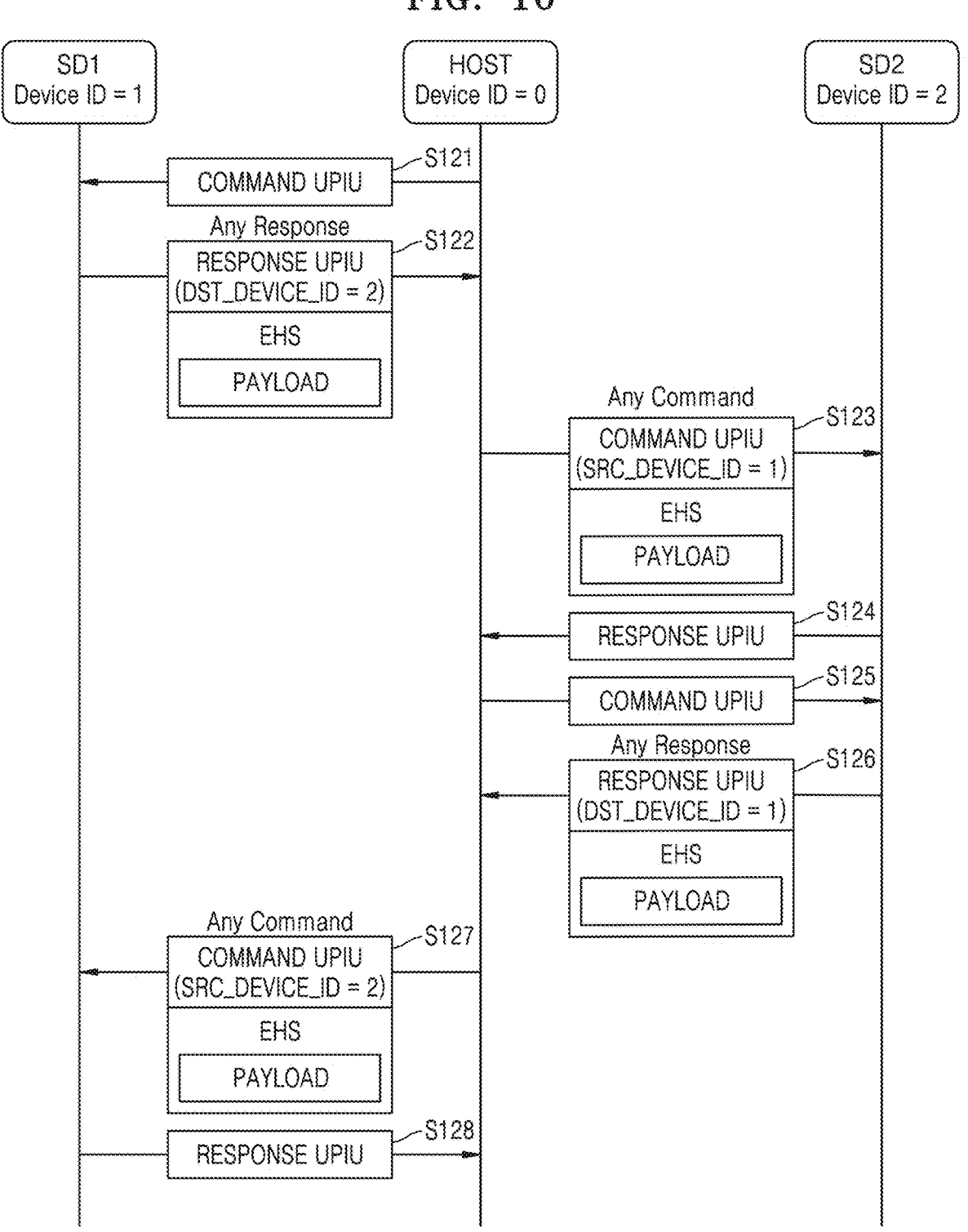
Figure 11:
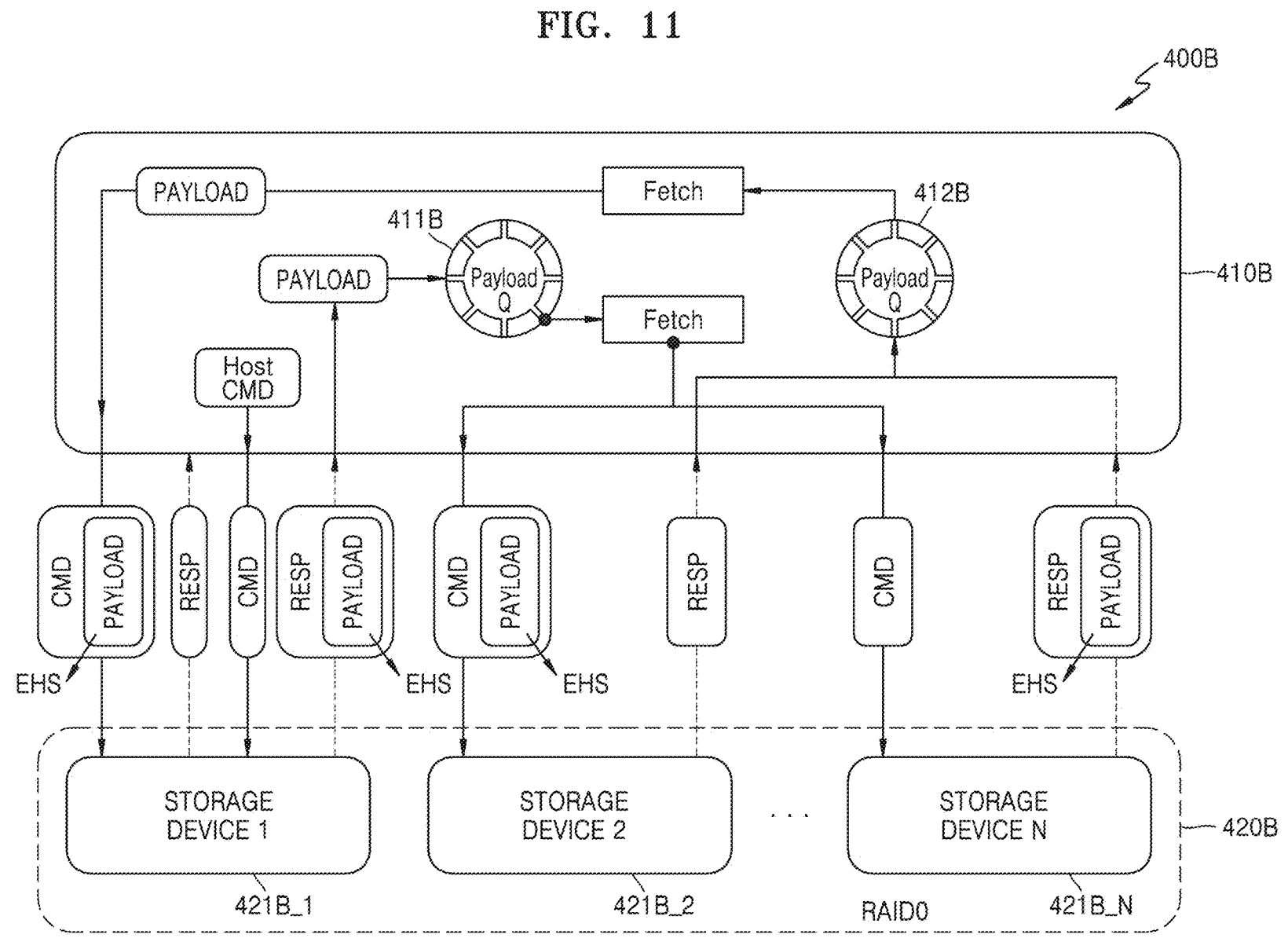

FIGS. 10 and 11 are diagrams showing example embodiments in which a storage device communicates information in the form of a payload. As an example, the storage device may directly provide a payload to another storage device without configuring a command according to a format of a particular interface. Descriptions already given above are omitted.

Referring to FIG. 10, the first storage device SD1 may transmit a payload to the second storage device SD2, and the payload may include various types of information. As an example, the payload may include temperature information or various types of information for synchronization of background operations.

The first storage device SD1 may receive a command UPIU from the host in S121 and may transmit a response UPIU including a payload to the host in response to the command UPIU in S122. As an example, the payload may be included in an EHS region, and a device ID value (i.e., DST_DEVICE_ID=2) indicating the second storage device SD2 as a target storage device to be provided with the payload may be included in a header region of the response UPIU. The host may include the payload provided from the first storage device SD1 in any UPIU (e.g., the command UPIU) to be transmitted to the second storage device SD2 in S123, and the host may receive a response UPIU that responds to the command UPIU from the second storage device SD2 in S124. In addition, in an example embodiment, a device ID value (i.e., SRC_DEVICE_ID=1) indicating a source storage device may be included in the UPIU provided from the host to the second storage device SD2 as at least one piece of information related to the payload, the second storage device SD2 may determine that the payload is provided from the first storage device SD1.

When the second storage device SD2 provides information that responds to the payload from the first storage device SD1, the second storage device SD2 may generate a payload including response information. The second storage device SD2 may receive the command UPIU from the host in S125 and transmit a response UPIU that responds to the command UPIU to the host in S126. At this time, the second storage device SD2 may include the payload including the response information in the response UPIU to be transmitted to the host, and may include a device ID value (i.e., DST_DEVICE_ID=1) corresponding to a target storage device to be provided with the payload in the response UPIU.

The host may transmit the command UPIU as any UPIU to the first storage device SD1 in S127, and at this time, the host may include a payload provided from the second storage device SD2 in the command UPIU to be provided to the first storage device SD1, and may also including a device ID value (i.e., SRC_DEVICE_ID=2) of a source storage device in the command UPIU. Also, the first storage device SD1 may transmit a response UPIU that responds to the command UPIU to the host in S128.

FIG. 11 shows an example of a storage system related to the operations shown in FIG. 10.

Referring to FIG. 11, a storage system 400B may include a host 410B and a memory package 420B, and the memory package 420B may include first to N-th storage devices 421B_1 to 421B_N. In addition, the host 410B may include a first queue 411B and a second queue 412B, which store payloads provided from storage devices. As an example, the first queue 411B may store payloads provided from any one storage device to a target storage device, and the second queue 412B may store payloads including response information provided from storage devices which have received the payloads.

Because information being communicated between the source storage device and the target storage device has the form of payloads, the payload provided from the storage device is not provided independently (i.e., directly) to another target storage device, but the payload may be provided to the storage device in a method of being included in any UPIU generated by the host. For example, the payload may be provided to the storage device via the host. In addition, the storage device may include a payload including response information in any UPIU generated by the storage device when transmitting the payload including the response information.

In an example embodiment, a field value indicating the formation (i.e., format) of information being communicated between the storage devices may be further included in a UPIU to be transmitted and received between the host and storage devices. As an example, the field value indicating the format may be included in the header region or the EHS region of a UPIU, and the host may refer to the field value included in the UPIU to interpret information being communicated between the storage devices as a command that may be independently transmitted or a payload that may not be independently transmitted. In an example embodiment, the host may transmit an internal command extracted from the UPIU to the storage device or transmit the UPIU including the extracted payload in an EHS region thereof to the storage device, based on an interpretation result of the field value.

In the following description, it is assumed that a storage device communicates information in the form of a command or a payload in each example embodiment, but each example embodiment may be applied to cases where a storage device communicates information in the form of a command or payload. In addition, although the storage device is described as providing an internal command or internal response, the terms of internal command and internal response are used to distinguish the terms from commands and responses communicated between the storage device and the host, and a storage device may be described as providing commands and responses to other storage devices.

FIGS. 12 and 13 are diagrams showing examples in which an internal command and an internal response are included in an EHS region of a UPIU according to example embodiments. In the description regarding FIGS. 12 and 13, as various fields of the UPIU are shown in FIGS. 12 and 13 correspond to the fields corresponding to the UFS interface, detailed descriptions thereof are omitted. In addition, a storage device may generate an internal command according to the UFS interface, and thus the internal command may be referred to as an internal command UPIU. The storage device may include command values instructing various requests and management for other storage devices in a command descriptor block (CDB) of the internal command UPIU.

Referring to FIG. 12, the internal command may be included in the EHS region of any UPIU (e.g., a response UPIU) transmitted by the storage device. The EHS region may include an EHS header region and an EHS data region. As an example, the internal command may be included in the EHS data region of the EHS region, and accordingly, the EHS region of the response UPIU may include the EHS header region and the internal command.

The header region of the command UPIU and the response UPIU, which correspond to the UFS interface, may include multiple fields including a transaction type field, a LUN field indicating a logical unit number targeted by a request, a task tag field related to a task request, a device information field indicating device level information, a total EHS length field indicating the size of the EHS region, a data segment length field indicating the number of valid bytes in the data segment of a UPIU, or the like.

Some fields in the header region may correspond to a reserved region. A device ID field according to an example embodiment may be added to the header region of the command UPIU or the response UPIU, and a target device ID field and a source device ID field may be added to an existing reserved region. In FIG. 12, a target device ID field in which an ID value indicating a storage device to which an internal command will be transmitted is stored is described, and a host may determine a storage device to which the internal command will be transmitted by checking a value of the target device ID field of a response UPIU. A source device ID field may be further included in the header area of the response UPIU. In addition, when information being communicated between storage devices corresponds to internal commands in a certain format, the device ID field and the source device ID field may be further included in the header region of the internal command.

A value of the target device ID field may be defined in various ways, and according to the defined values, transmission of internal commands may be performed in various ways. As an example, when the target device ID field has a value of "0", it may indicate that the response UPIU does not include an internal command. For example, the response UPIU may correspond to the host when the target device ID field has a value of "0". In addition, two or more device ID values may be included in the target device ID field, or the response UPIU may include at least two target device ID fields. In this case, the internal command may be provided to at least two storage devices. In addition, in an example embodiment, the target device ID field of a particular value (e.g., OFh) may indicate broadcasting of an internal command included in a response UPIU, and in this case, the host may transmit the internal command to all storage devices except the source storage device.

FIG. 13 shows a case in which a host transmits an internal response to a storage device.

A second storage device that has received an internal command from a first storage device may generate an internal response corresponding to the internal command, and according to example embodiments, the second storage device may independently transmit the internal response to the host or may include the internal response in the EHS region of any UPIU and transmit the UPIU to the host. The host may store the received internal response in a queue within the host. In addition, as shown in FIG. 13, the host may include the internal response in any UPIU (e.g., a command UPIU) to be transmitted to the first storage device to be provided with the internal response. In addition, the header region of the command UPIU may include a field in which a source device ID value is stored, and a device ID value of the second storage device providing the internal response may be stored in a source device ID field.

FIGS. 14A, 14B, 15A, 15B, 16A, and 16B are diagrams showing examples in which device ID fields are added to various UPIUs according to a UFS interface. In the following description, only some of the various types of fields of the UPIU of the UFS interface are discussed, and detailed descriptions of some fields of the UFS interface are omitted. In addition, in FIGS. 14A, 14B, 15A, 15B, 16A, and 16B, the case in which a target device ID value is stored is shown. As discussed above, the source device ID value may be further included in the UPIU.

FIGS. 14A and 14B show the case in which a device ID field is further added to a command UPIU and a response UPIU. As an example, as shown in FIG. 14A, a portion of the eighth field among multiple fields included in the header region of the command UPIU may correspond to a reserved region, and the device ID field according to example embodiments may be added to the reserved region of a portion of the eighth field. In addition, as shown in FIG. 14B, a portion of the sixth field among the multiple fields included in the header region of the response UPIU may correspond to a reserved region, and the device ID field according to example embodiments may be added to the reserved region of a portion of the sixth field.

FIGS. 15A and 15B show a case in which a target device ID field is added to a task management request UPIU and a task management response UPIU. As an example, as shown in FIG. 15A, a portion of the eighth field among multiple fields included in the header region of the task management request UPIU may correspond to a reserved region, and the device ID field according to example embodiments may be added to the reserved region of a portion of the eighth field. In addition, as shown in FIG. 15B, a portion of the sixth field among the multiple fields included in the header region of the task management response UPIU may correspond to a reserved region, and the device ID field according to example embodiments may be added to the reserved region of a portion of the sixth field.

FIGS. 16A and 16B show a case in which a target device ID field is added to a query request UPIU and a query response UPIU. As an example, as shown in FIG. 16A, a portion of the eighth field among multiple fields included in the header region of the query request UPIU may correspond to a reserved region, and the device ID field according to example embodiments may be added to the reserved region of a portion of the eighth field. In addition, as shown in FIG. 16B, a portion of the sixth field among the multiple fields included in the header region of the query response UPIU may correspond to a reserved region, and the device ID field according to example embodiments may be added to the reserved region of a portion of the sixth field.

Figure 17B:
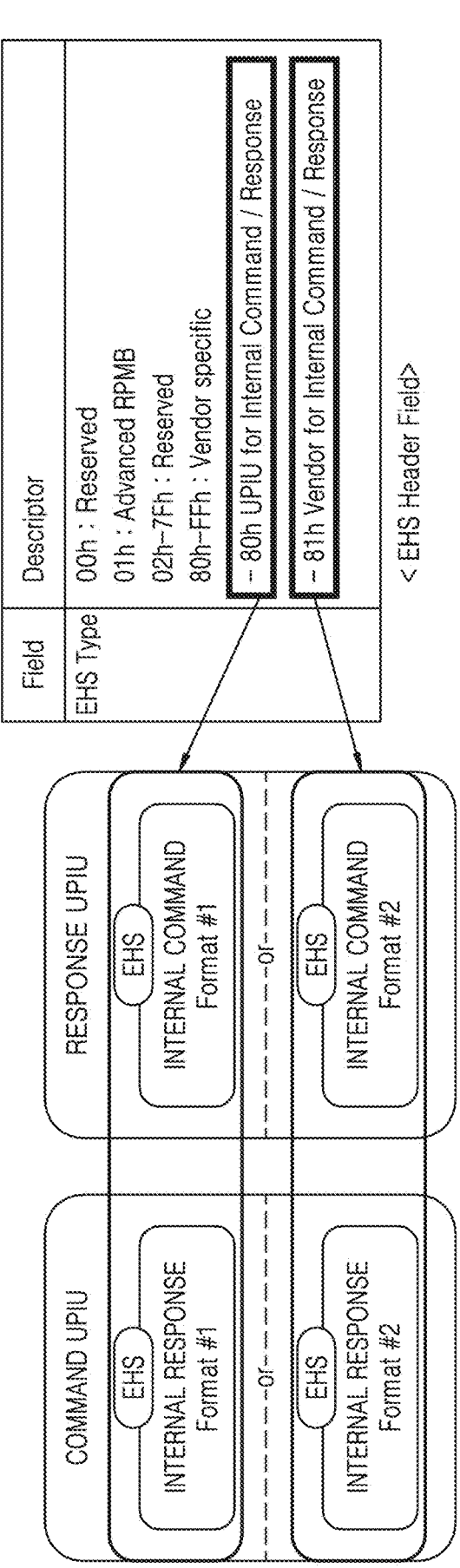

FIGS. 17A and 17B are diagrams showing examples in which a value indicating the format of information communicated by a storage device is included in a UPIU, according to example embodiments.

Referring to FIG. 17A, each of the various types of UPIUs of the UFS interface may include an EHS region, and the EHS region may include an EHS header region and an EHS data region. As an example, the EHS region may have a size of 32 bytes, and the EHS header region may have a size of 4 bytes. In addition, the size of the remaining 28 bytes of the EHS region may correspond to the EHS data region. Each of the fields in the EHS header region may store various types of values, and as an example, fields in the EHS header region may include a field (bLength) storing a value indicating the size of the EHS data region, and EHSType and EHSSubType fields, which indicate the type of information stored in the EHS data region.

In an example embodiment, a value indicating the format of information stored in the EHS data region may be defined in the EHSType field. For example, some of the values defined in the EHSType field may correspond to vendor specific values, and some of the vendor specific values may be defined as information indicating the format of information provided by a storage device.

For example, as shown in FIG. 17B, a field value related to the format may be stored in the EHS header region of the command UPIU or the response UPIU, and when a value of 80h is stored in the EHSType field, it may indicate that an internal command from a storage device, which is included in the command UPIU or the response UPIU, has a first format (e.g., a UPIU format). In addition, when a value of 81h is stored in the EHSType field, it may indicate that the internal command has a second format (e.g., the IPC negotiated between storage devices). Alternatively, when another predefined value is stored in the EHSType field, it may indicate that information in the form of payloads is included in the EHS data region.

According to an example embodiment, internal commands having payload or various formats may be communicated between storage devices, and the internal commands may be implemented based on various formats, for example, the internal commands may be implemented as host commands at a high level of abstraction or may be implemented as commands at low abstraction level, which correspond to the IPC. In addition, the host may check the format of information being communicated between storage devices based on the information included in the EHS header region of the UPIU.

FIGS. 18 to 24 are diagrams showing communication examples between storage devices in various cases, according to example embodiments. Regarding communication between storage devices, some of FIGS. 18 to 24 show that internal commands are communicated, and others show that payloads are communicated, but as discussed above, each example embodiment may be applied together to communication of internal commands and communication of payloads.

Referring to FIG. 18, the first storage device SD1 may transmit a response UPIU to the host and may include a payload (e.g., a first payload) to be provided to the second storage device SD2 in the response UPIU. The response UPIU may include a device ID value indicating the second storage device SD2 as a target storage device. The host may include the first payload in a command UPIU to be provided to the second storage device SD2, and the second storage device SD2 may generate a payload (e.g., a second payload) to be provided to the first storage device SD1 in response to the reception of the first payload. In addition, the second storage device SD2 may include the second payload in a response UPIU to be provided to the host.

In an example embodiment, when a UPIU to be transmitted from the host to the first storage device SD1 does not exist, the host may generate any UPIU and include the second payload in the UPIU to transmit the UPIU to the first storage device SD1. As an example, the host may generate a command UPIU corresponding to a write buffer command (CMD) corresponding to an SCSI command set and may include the second payload in the write buffer CMD.

When the host transmits the write buffer CMD to the first storage device SD1, the host may additionally transmit a DATA OUT UPIU including data to the first storage device SD1. In an example embodiment, as described above, the second payload may be included in the write buffer CMD, or when the second payload has a large size that may not be included in an EHS region, the host may also include the second payload in the DATA OUT UPIU.

As discussed above, the host may generate any UPIU even in an environment where the host does not provide a UPIU to a particular storage device and may include an internal command/internal response or payload in the generated UPIU, and thus the communication between storage devices may be stably performed via the host.

Figure 19:
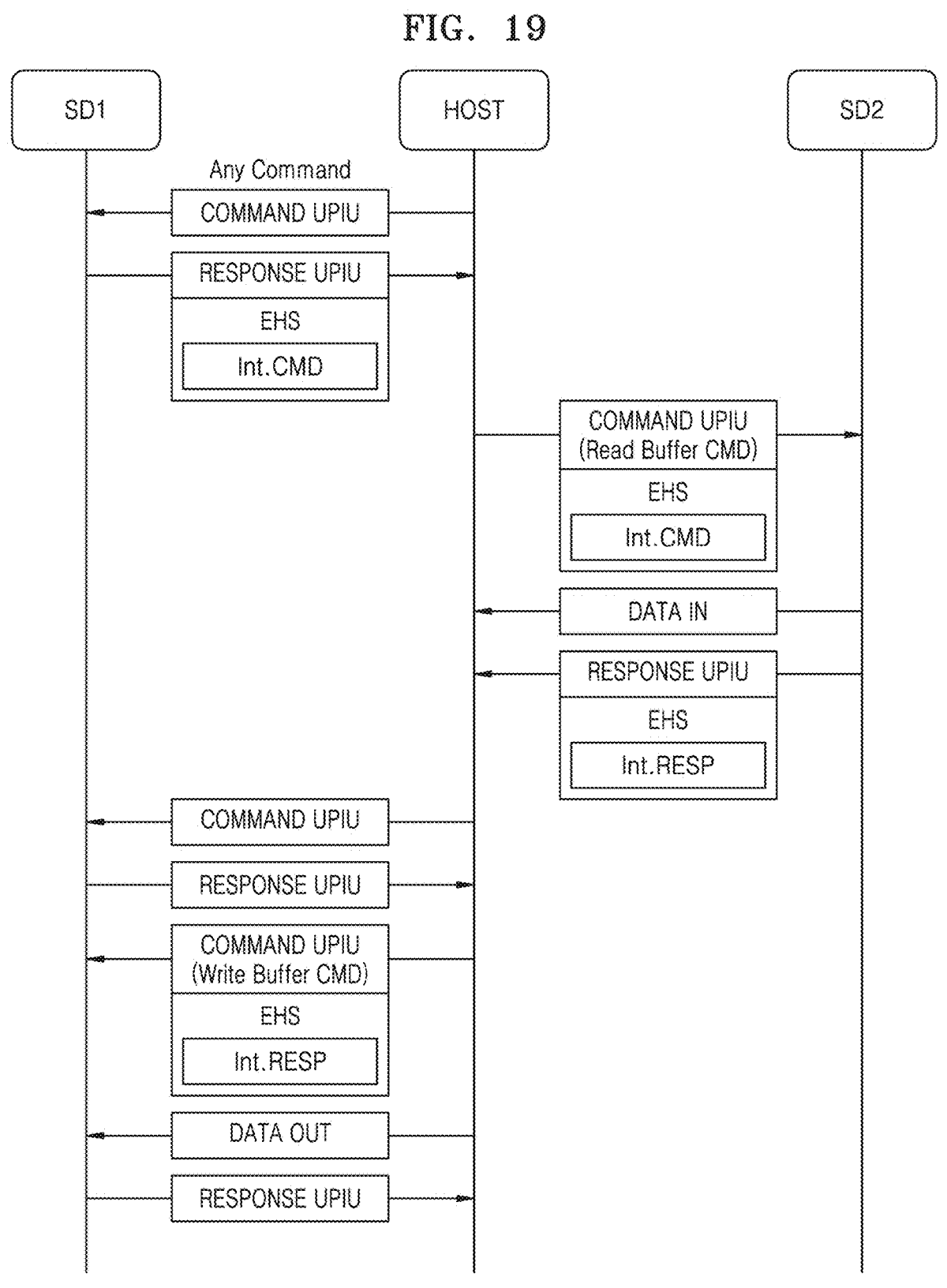
Figure 20:
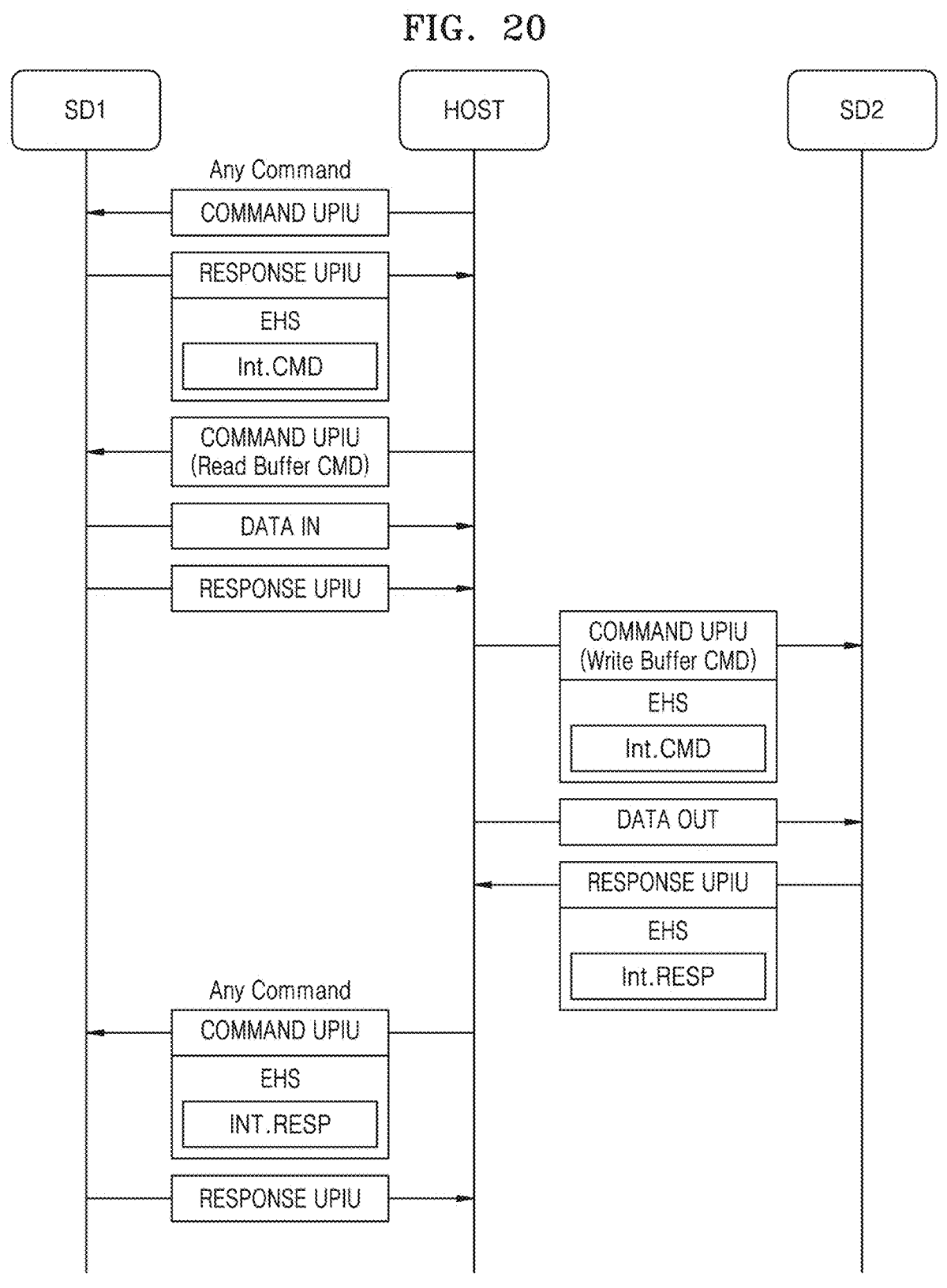

FIGS. 19 and 20 show operation examples when a command being communicated between storage devices accompanies data.

Referring to FIG. 19, the first storage device SD1 may include an internal command in a response UPIU to be transmitted to the host. As an example, the internal command may be a command that requires reception of data, and the host may include the internal command in any UPIU to be transmitted to the second storage device SD2.

The host may check values of fields of the internal command included in a UPIU provided from the first storage device SD1. As an example, the internal command may check a flag value of a field indicating writing or reading and a value of a field indicating an expected transfer length. When the flag value of the field indicates reading, and the value of the expected transfer length is greater than 0, it may be determined that reception processing of data from the second storage device SD2 is required.

In an example embodiment, the host may generate a command UPIU corresponding to a read buffer CMD and may include the internal command from the first storage device SD1 in the read buffer CMD. In addition, the host may receive a DATA IN UPIU including data from the second storage device SD2 in response to the read buffer CMD. In addition, the host may receive a UPIU including an internal response from the second storage device SD2.

The host may transmit the internal response and data to the first storage device SD1 based on various methods. As an example, the host may include the internal response in a command UPIU as any UPIU to be transmitted to the first storage device SD1.

In an example embodiment, when data is needed to be provided to the first storage device SD1, as shown in FIG. 19, the host may generate the write buffer CMD and use the write buffer CMD. For example, the host may include the internal response from the second storage device SD2 in the write buffer CMD. In addition, the host may transmit a DATA OUT UPIU to the first storage device SD1 and may include data provided from the second storage device SD2 in the DATA OUT UPIU.

According to an example embodiment, when communication of data having a large size is required between storage devices, a host may provide data to a storage device or receive data from the storage device by using a DATA OUT UPIU and a DATA IN UPIU, and thus data having a relatively large size may be communicated between storage devices.

Referring to FIG. 20, the first storage device SD1 may include the internal command in a response UPIU to be transmitted to the host, and the internal command may be a command that requires transmission of data to the second storage device SD2. The host may check values of fields included in the internal command, and when a flag value of a field indicates writing, and a length of an expected transfer length is greater than 0, it may be determined that reception processing of data from the first storage device SD1 is required.

To receive data from the first storage device SD1, the host may generate a command UPIU corresponding to the read buffer CMD and transmit the command UPIU to the first storage device SD1. In addition, the host may receive data from the first storage device SD1 through the DATA IN UPIU.

The host may transmit any UPIU including the internal command to the second storage device SD2. As an example, the host may transmit the command UPIU corresponding to the write buffer CMD to the second storage device SD2, and may transmit a DATA OUT UPIU including data provided from the first storage device SD1 to the second storage device SD2. Also, the second storage device SD2 may transmit a response UPIU including an internal response to the host, and the host may include the internal response in a command UPIU to be transmitted to the first storage device SD1.

As discussed above, various types of commands are communicated between storage devices, and data communication according to the types of commands may be performed. As an example, when an internal command from the first storage device SD1 corresponds to a query request command (e.g., a descriptor write request, etc.) related to the internal setting of the second storage device SD2, and setting data is to be transmitted in relation to internal setting, data may be transmitted from the first storage device SD1 to the second storage device SD2 according to the flow shown in FIG. 20.

FIG. 21 shows an example of communication between storage devices when the entry and exit of hibernation is managed by a host according to an example embodiment.

In an example embodiment where the host does not have a UPIU to be transmitted to a storage device, the transmission of payload from the storage devices may be continuously requested. In an example embodiment, the host may store payloads received from a storage device in an internal queue thereof, and when the host does not have a UPIU to be transmitted to the storage device, the host may enter the mode of a system into a hibernation section. During the hibernation section, the host may stop transmission of payloads between storage devices. Thereafter, the host may transmit payloads stored in a queue to a storage device after exit of the hibernation section.

As shown in FIG. 21, the host may receive a response UPIU including a payload from the first storage device SD1 and may store the received payload in a queue within the host. Thereafter, the host may enter a storage system into hibernation, and may stop transmission of payloads during the hibernation section. Thereafter, the hibernation section is exited, and the host may fetch the payload stored in the queue and include the payload in any UPIU (e.g., a command UPIU) to be transmitted to the second storage device SD2. In addition, the host may include the payload in the command UPIU to be transmitted to the first storage device SD1.

Figure 22:
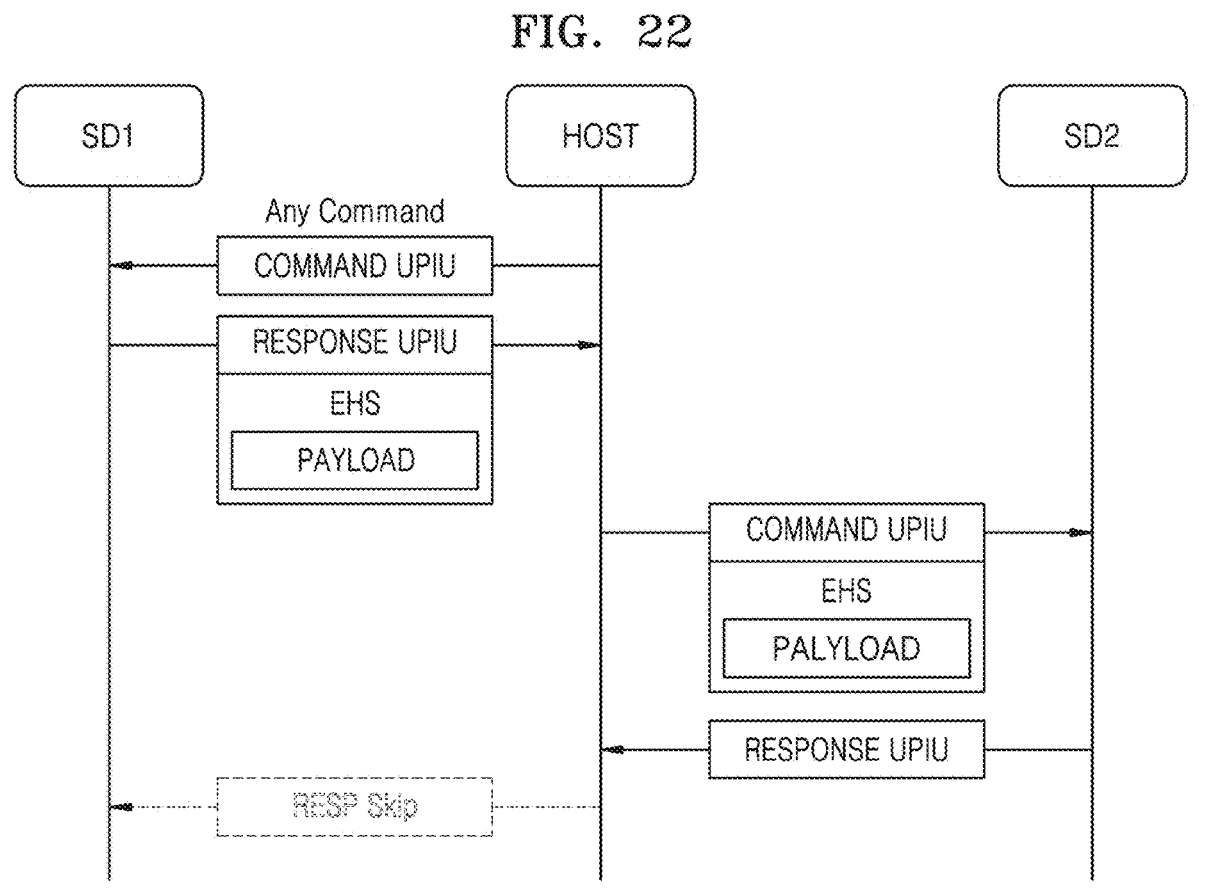

FIG. 22 shows a case where a payload is provided in one-way direction, and a storage device that has received the payload having the characteristics of one-way direction may not provide an internal response or payload that responds to the payload.

Referring to FIG. 22, the host may receive a response UPIU including a payload from the first storage device SD1 and may include the payload in a command UPIU to be transmitted to the second storage device SD2. As an example, when the first storage device SD1 performs only the transmission of particular information to the second storage device SD2 and does not need to check a result responsive to the particular information, the second storage device SD2 may not generate an internal response or payload for responding to the reception of the payload, and may generate only a response UPIU that responds to the command UPIU of the host. Accordingly, an operation in which the host transmits an internal response or payload to the first storage device SD1 may be omitted.

Figure 24:
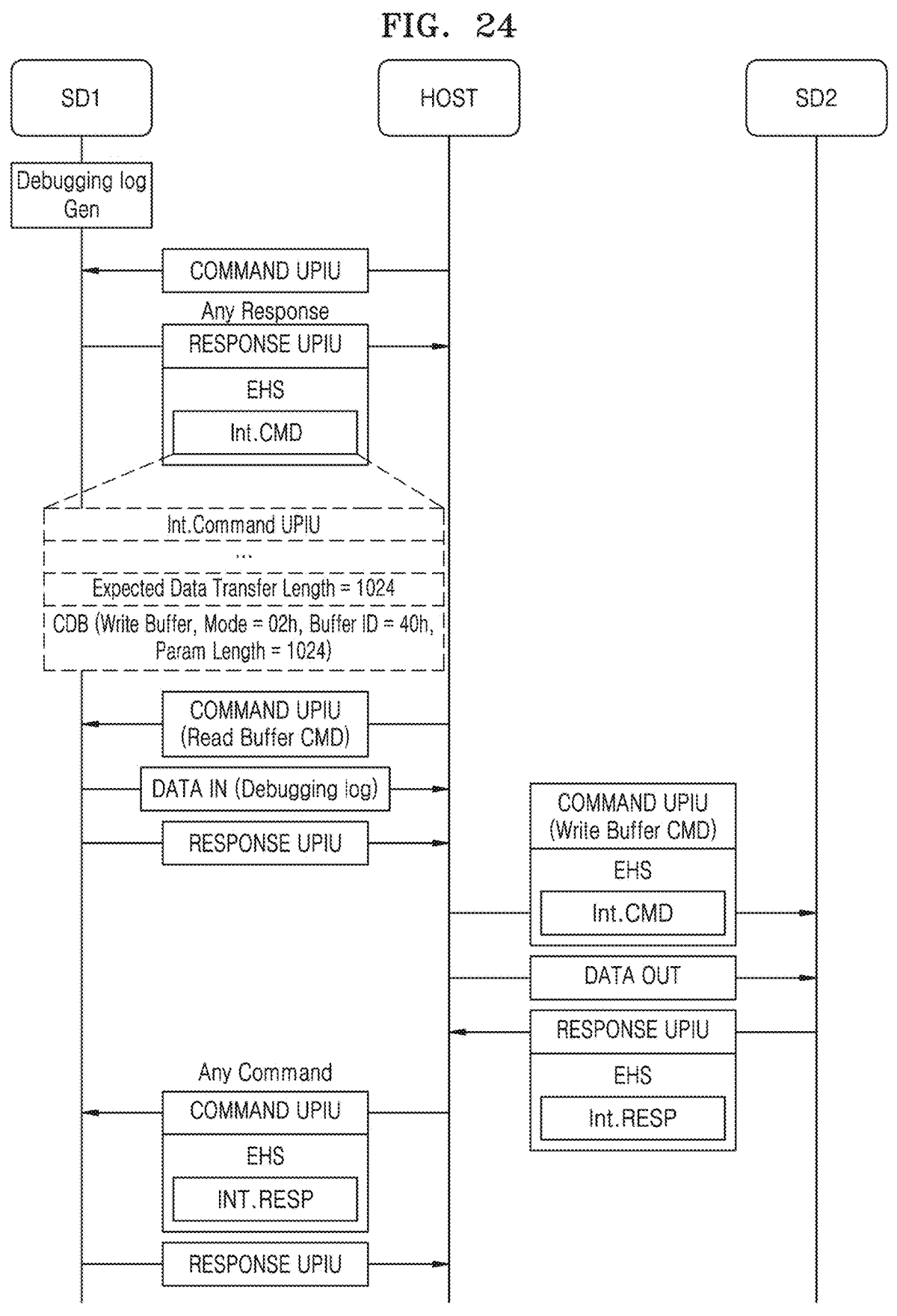

FIGS. 23 and 24 are diagrams showing examples of internal operations of storage devices using internal commands or payloads according to example embodiments.

As shown in FIG. 23, throttling synchronization may be performed between storage device is shown.

When the temperature of a storage device rises to a particular threshold value or higher, throttling may be performed to adjust the performance of the storage device to protect the storage device, and in an environment including multiple storage devices, the performance of the multiple storage devices may be adjusted together. That is, the multiple storage devices need to operate at the same or similar level of performance.

For example, when the first storage device SD1 detects a temperature rise, the first storage device SD1 may generate a first payload (or an internal command) that requests the performance of throttling to the second storage device SD2, and the first storage device SD1 may include the first payload in any response UPIU to be transmitted to the host. The host may include the first payload in a command UPIU to be transmitted to the second storage device SD2.

The second storage device SD2 may analyze the payload provided from the first storage device SD1 and perform throttling to reduce the performance of the second storage device SD2 based on the determination of performance request of throttling. In addition, the second storage device SD2 may generate a second payload having information indicating that the throttling was performed normally, and may include the second payload in a response UPIU to be transmitted to the host. In addition, the host may include the second payload in a command UPIU to be transmitted to the first storage device SD1.

As discussed above, an EHS region may include an EHS header region and an EHS data region, and a value indicating the format of information being transmitted between storage device may be stored in an EHSType field of the EHS header region. As an example, according to the value of the EHSType field, it may be determined that information of payload format is stored in the EHS data region. In addition, a payload may be stored in the EHS data region, and the payload may include various values negotiated between the storage devices. As an example, when a payload has a value of 70h, the payload may include information requesting the performance of throttling, and when the payload has a value of 71h, the payload may include information indicating that the performance of throttling was completed.

As shown in FIG. 24, debugging log information may be communicated between storage devices through internal commands.

When an error occurs during the operation of the first storage device SD1, the first storage device SD1 may extract debugging log information for error analysis. However, as an error occurs in the first storage device SD1, the debugging log information may be managed by a storage system to be stored in the second storage device SD2. As discussed above, when the first storage device SD1 provides debugging log information to the second storage device SD2, the first storage device SD1 may transmit a response UPIU including an internal command to the host. As an example, when the internal command has a format according to the UFS interface, the internal command may correspond to a command UPIU, and as an example, the internal command may correspond to a write buffer CMD requesting reading of data.

The host may check the format of the internal command provided by the first storage device SD1 through the field value of the EHS header region, and may also check the values of the fields of the header region of the internal command. As an example, the host may check a value of a field indicating an expected transfer length in the internal command, and when the value of the expected transfer length is greater than 0, the host may determine that there is data to be transmitted by the first storage device SD1. The host may transmit the command UPIU corresponding to the read buffer CMD to the first storage device SD1, and may receive data corresponding to debugging log information from the first storage device SD1.

The host may transmit an internal command corresponding to the write buffer CMD to the second storage device SD2, or may transmit the command UPIU including the internal command to the second storage device SD2. In addition, the host may transmit a DATA OUT UPIU including data corresponding to the debugging log information to the second storage device SD2 along with the transmission of internal commands. The second storage device SD2 may transmit an internal response or a response UPIU including the internal response to the host, and the host may transmit the internal response from the second storage device SD2 to the first storage device SD1.

As shown in FIG. 24, as various types of information included in an internal command, 02h, which is a mode value, may indicate that data will be transmitted through a write buffer CMD, and a buffer ID value may indicate a use for which the provided data will be processed. As an example, when the buffer ID value is 40h, it may indicate that data corresponds to debugging log information.

In FIGS. 23 and 24, an example of managing storage devices according to an internal command or payload is described, but various types of internal commands or payloads may be communicated between storage devices according to example embodiments. As an example, to synchronize garbage collection operations, any one storage device may provide an internal command or payload requesting performance of garbage collection to another storage device, or management operations of various methods may be performed, for example, temperature information detected by any one storage device is provided to another storage device.

In some example embodiments, each of the components represented by a block, including those illustrated in FIGS. 1-4, may be implemented as various numbers of hardware and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. An operating method of a storage device communicating with a host, the operating method comprising:
    receiving a first packet from the host;
    transmitting a second packet to the host in response to the first packet, wherein the second packet comprises first information to be provided to an external storage device and a device ID value that indicates the external storage device, wherein the second packet is configured to request that the device ID value and the first information be included in a new packet generated by the host and transmitted to the external storage device; and
    receiving a third packet from the host, wherein the third packet comprises second information generated by the external storage device.

2. The operating method of claim 1, wherein the second information comprises response information generated by the external storage device in response to the first information.

3. The operating method of claim 1, wherein the third packet is generated by the external storage device, and the third packet is received separate from a packet according to an interface between the host and the storage device.

4. The operating method of claim 1, wherein, the second information corresponds to a payload type, and the third packet is generated by the host according to an interface between the host and the storage device.

5. The operating method of claim 1, further comprising performing communication with the host according to a universal flash storage (UFS) interface,
    wherein each of the first to third packets comprises a UFS protocol information unit (UPIU) corresponding to the UFS interface.

6. The operating method of claim 5, wherein the second packet comprises a header region and an extra header segment (EHS) region, which correspond to the UFS interface,
    wherein the device ID value is provided in the header region,
    wherein the first information is provided in the EHS region,
    wherein the EHS region comprises an EHS header region comprising multiple fields, and an EHS data region,
    wherein the first information is provided in the EHS data region, and
    wherein a value indicating a format of the first information is provided in at least one field of the EHS header region.

7. The operating method of claim 5, wherein the first information indicates a command and is accompanied by data provided by the storage device, and
    wherein the operating method further comprises:

receiving a read buffer command from the host after transmitting the second packet; and transmitting the data to the host in response to reception of the read buffer command.

8. The operating method of claim 7, further comprising generating debugging log information based on an error occurring in the storage device, wherein the first information indicates a command requesting storage of the debugging log information, and the debugging log information is transmitted to the host as the data.

9. The operating method of claim 5, wherein the second information indicates a command and is accompanied by data received by the storage device, and wherein the operating method further comprises:

receiving a write buffer command from the host; and receiving data from the external storage device through the host.

10. The operating method of claim 1, wherein the second packet comprises a header region and an extra header segment (EHS) region, wherein the EHS region comprises an EHS header region comprising multiple fields, and an EHS data region, wherein the first information is provided in the EHS data region, and wherein a value indicating a format of the first information is provided in at least one field of the EHS header region.

11. A storage device comprising:

a non-volatile memory core configured to store data; and a memory controller configured to communicate with a host according to a universal flash storage (UFS) interface and comprising a packet management circuit configured to generate a first packet corresponding to a UFS protocol information unit (UPIU) and process a second packet received from the host, wherein the memory controller is further configured to:

transmit a first UPIU to the host, the first UPIU comprising first information to be provided to an external storage device and a device ID value that indicates the external storage device, wherein the first UPIU is configured to request that the device ID value and the first information be included in a new UPIU generated by the host and transmitted to the external storage device, and receive a second UPIU from the host, the second UPIU comprising second information provided from the external storage device.

12. The storage device of claim 11, wherein each of the first UPIU and the second UPIU comprises a header region, and an extra header segment (EHS) region, which are correspond to the UFS interface, and wherein the packet management circuit is further configured to include the first information in the EHS region of the first UPIU.

13. The storage device of claim 12, wherein the packet management circuit is further configured to store the device ID value of the external storage device in the header region of the first UPIU.

14. The storage device of claim 13, wherein the external storage device of one among a plurality of external storage devices, wherein the storage device is configured to communicate with the plurality of external storage devices, and wherein the packet management circuit is further configured to provide a certain setting value as the device ID value in the header region of the first UPIU to control the host to provide the first information to each of the plurality of external storage devices.

15. The storage device of claim 12, wherein the memory controller further comprises a command/response generation circuit configured to generate a first internal command to be provided to the external storage device or an internal response responding to a second internal command provided from the external storage device, and wherein the packet management circuit is further configured to include the first internal command in the EHS region of the first UPIU as the first information.

16. The storage device of claim 15, wherein the EHS region comprises an EHS header region with multiple fields, and an EHS data region, and wherein the packet management circuit is further configured to include a value indicating a format of an internal command in at least one field of the EHS header region of the first UPIU.

17. The storage device of claim 15, wherein the second information included in the second UPIU corresponds to an internal command generated by the external storage device, wherein the command/response generation circuit is further configured to generate the internal response responding to the internal command, and wherein the packet management circuit is further configured to generate a third UPIU to be transmitted to the host, the third UPIU comprising the internal response.

18. A storage device comprising:

a non-volatile memory core configured to store data; and a memory controller configured to control the storage device to transmit a transmission packet corresponding to a universal flash storage (UFS) protocol information unit (UPIU) to a host and receive a reception packet from the host according to a UFS interface, wherein the memory controller comprises:

a UFS storage device interface configured to generate first information to be provided to an external storage device and a device ID indicating the external storage device;

a transport protocol layer (UTP) protocol engine configured to generate a first UPIU comprising the first information and the device ID, wherein the first UPIU is configured to request that the device ID and the first information be included in a new packet generated by the host and transmitted to the external storage device; and a UFS interconnection layer configured to transmit the first UPIU to the host.

19. The storage device of claim 18, wherein the UTP protocol engine is further configured to include the device ID in a header region of the first UPIU the first information in an extra header segment (EHS) region of the first UPIU.

20. The storage device of claim 19, wherein the UTP protocol engine is further configured to receive a second UPIU comprising second information from the host and identify a format of the second information based on a field value comprised in the EHS region of the second UPIU.

* * * * *